US006876624B1

(12) United States Patent
Fujita et al.

(10) Patent No.: US 6,876,624 B1
(45) Date of Patent: Apr. 5, 2005

(54) MULTIPLEX CONVERSION UNIT

(75) Inventors: Hiroyuki Fujita, Yokohama (JP);
Naohisa Hamaguchi, Yokohama (JP);
Yoshihiro Ashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/265,373

(22) Filed: Mar. 10, 1999

Related U.S. Application Data

(63) Continuation of application No. 08/789,116, filed on Jan. 27, 1997, now Pat. No. 5,896,387.

(30) Foreign Application Priority Data

Jan. 30, 1996 (JP) ........................................... 08-014094

(51) Int. Cl.$^7$ ......................... G04R 31/08; H04L 12/50; H04J 3/16
(52) U.S. Cl. ........................ 370/220; 370/359; 370/467
(58) Field of Search ............................... 370/359, 220, 370/467, 376, 523, 528, 567, 223, 224, 225, 375, 377, 400, 539, 907, 463, 84, 538; 710/45; 359/135; 714/716, 701

(56) References Cited

U.S. PATENT DOCUMENTS

| 5,060,229 A | * 10/1991 | Tyrrell et al. ............... 370/537 |
| 5,311,501 A | * 5/1994 | Takatsu ....................... 370/357 |
| 5,412,652 A | * 5/1995 | Lu .............................. 370/907 |
| 5,455,832 A | 10/1995 | Bowmaster ................. 371/20.1 |
| 5,471,476 A | * 11/1995 | Hiramoto .................... 370/907 |
| 5,490,142 A | * 2/1996 | Hurlocker ................... 359/135 |
| 5,537,393 A | * 7/1996 | Shioda et al. ................ 370/223 |
| 5,546,403 A | * 8/1996 | Yamamoto et al. ......... 714/716 |
| 5,583,855 A | * 12/1996 | Ball ............................ 370/376 |
| 5,592,632 A | 1/1997 | Leung et al. ................ 395/306 |
| 5,600,648 A | * 2/1997 | Furuta et al. ................ 370/384 |
| 5,640,387 A | * 6/1997 | Takahashi et al. .......... 370/376 |
| 5,799,001 A | * 8/1998 | Lee et al. .................... 370/223 |
| 5,896,387 A | * 4/1999 | Fujita et al. ................. 370/359 |

OTHER PUBLICATIONS

Teranishi and Kitamura: *Design of Digital Network Transmission Facilities*, The Denki Tsushin Kyokai, Aug. 10, 1984, pp. 142–149 Group, ASCI Corp.

* cited by examiner

*Primary Examiner*—Duc Ho
*Assistant Examiner*—Phuongchau Ba Nguyen
(74) *Attorney, Agent, or Firm*—Kenyon & Kenyon

(57) ABSTRACT

A multiplex conversion unit is configured with those functions required for a specific network to which it is more economically applicable. Each OC-12IF circuit pack includes a switch for performing time slot assignment (TSA) between a plurality of high-speed transmission lines and at least a low-speed transmission line. An ADM circuit pack includes a switch for performing time slot interchange (TSI) between the high-speed transmission lines and the low-speed transmission line. In an application to a network requiring the TSI function, the switch of the OC-12IF circuit pack performs only the add/drop multiplex (ADM) operation between the signals input/output by the high-speed transmission lines and the ADM circuit pack, and the switch on the ADM circuit pack performs the TSI operation. In an application not requiring the TSI, the TSA operation is performed using a THRU circuit pack.

2 Claims, 23 Drawing Sheets

PATH SWITCH FUNCTION
(UPSR UNDER NORMAL CONDITION)

PATH SWITCH FUNCTION
(SWITCHED AT UPSR FAULT TIME)

LINE SWITCH FUNCTION
(4-FIBER BLSR UNDER NORMAL CONDITION)

LINE SWITCH FUNCTION
(SWITCHED AT 4-FIBER BLSR FAULT TIME)

US 6,876,624 B1

MULTIPLEX CONVERSION UNIT

This is a Continuation of application Ser. No. 08/789,116 filed 27 Jan. 1997, now U.S. Pat. No. 5,896,387 issued Apr. 20, 1999.

BACKGROUND OF THE INVENTION

The present invention relates to a multiplex conversion unit for multiplexing and demultiplexing digital signals between a plurality of low-speed transmission paths and a plurality of high-speed transmission paths in a digital communication network.

The technique described in "Design of Digital Network Transmission Facilities" by Teranishi and Kitamura, The Denki Tsusin Kyokai, Aug. 10, 1984, is known as a conventional multiplex conversion unit for multiplexing and demultiplexing digital signals between a plurality of low-speed transmission paths and a plurality of high-speed transmission paths in a digital communication network.

FIG. 10 shows a configuration of a typical multiplex conversion unit.

As shown in FIG. 10, a multiplex conversion unit 40 comprises a plurality of low-speed interface sections 43 for interfacing with a plurality of low-speed transmission paths 41, a high-speed interface section 45 for interfacing with a high-speed transmission path 42, and an add/drop multiplex (ADM) section 44 for multiplexing and demultiplexing between low-speed signals input/output by the low-speed interface sections 43 and the high-speed signals input/output by the high-speed interface section 45.

In recent years, various types of networks have been suggested including the point-to-point (or terminal MUX, hereinafter referred to as TM), add/drop chain (or linear ADM, hereinafter referred to as "LADM") and the "ring" using a plurality of multiplex conversion units.

In the case where a multiplex conversion unit of the same configuration is used for all types of networks, however, component parts (such as a switch) having functions not necessary for a given type of network may be incorporated in a multiplex conversion unit resulting in increased cost of the multiplex conversion unit.

SUMMARY OF THE INVENTION

An object of the present invention is to provide a configuration method of a multiplex conversion unit capable of changing the functions thereof by selecting the required functions in accordance with the types of the network involved.

The object of the invention is achieved by preparing several circuit packs having different functions and appropriately selecting the optimum circuit packs in accordance with the network type involved for constructing a multiplex conversion unit.

According to one aspect of the invention, there is provided a multiplex conversion unfit low in cost depending on the network type to which it is applied.

According to another aspect of the invention, there is provided a low-cost multiplex conversion unit constituting a network which the user can upgrade to a higher-level network with a minimum modification (i.e., with a minimum cost).

DESCRIPTION OF THE PREFERRED EMBODIMENTS

Before explaining an embodiment of the invention, explanation will be made about the manner in which a multiplex conversion unit is applied to various types of network described above.

Figure 11:
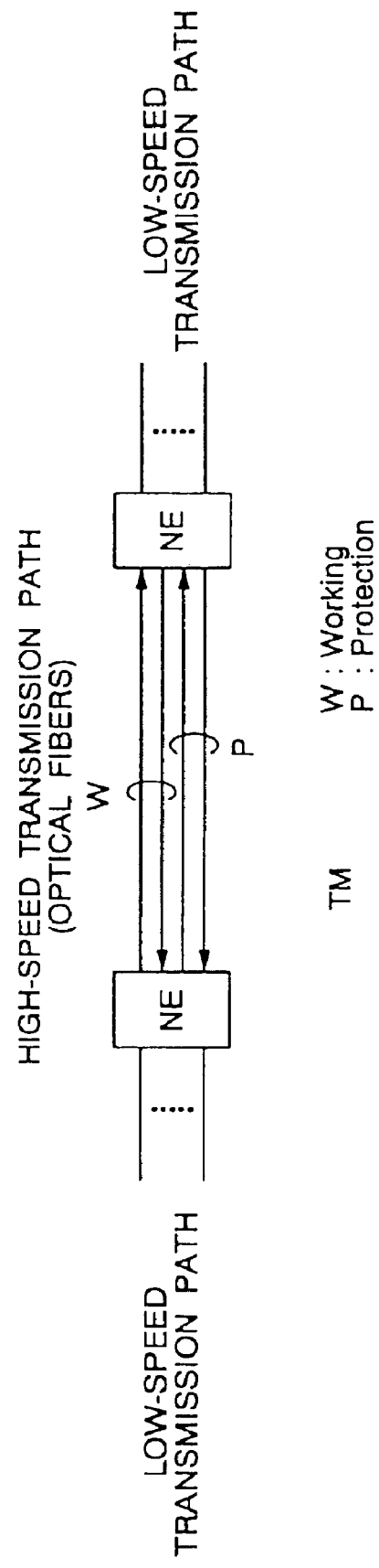
FIG. 11 is a diagram showing a TM network.
Figure 12:
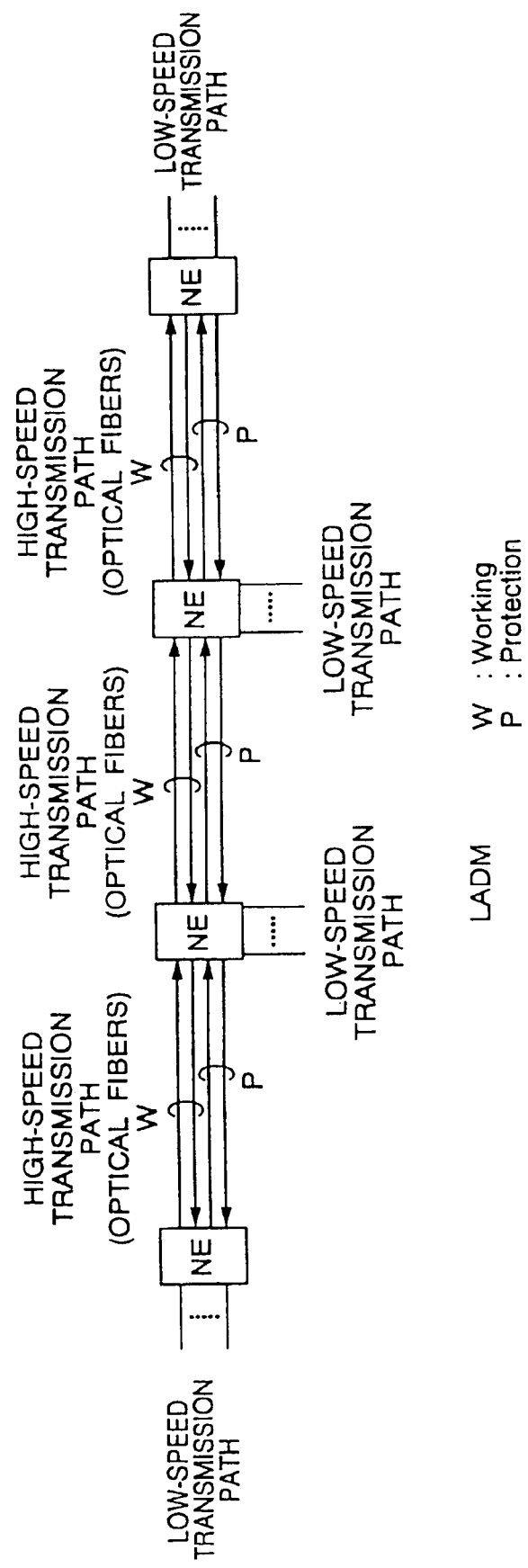
FIG. 12 is a diagram showing a LADM network.
Figure 13:
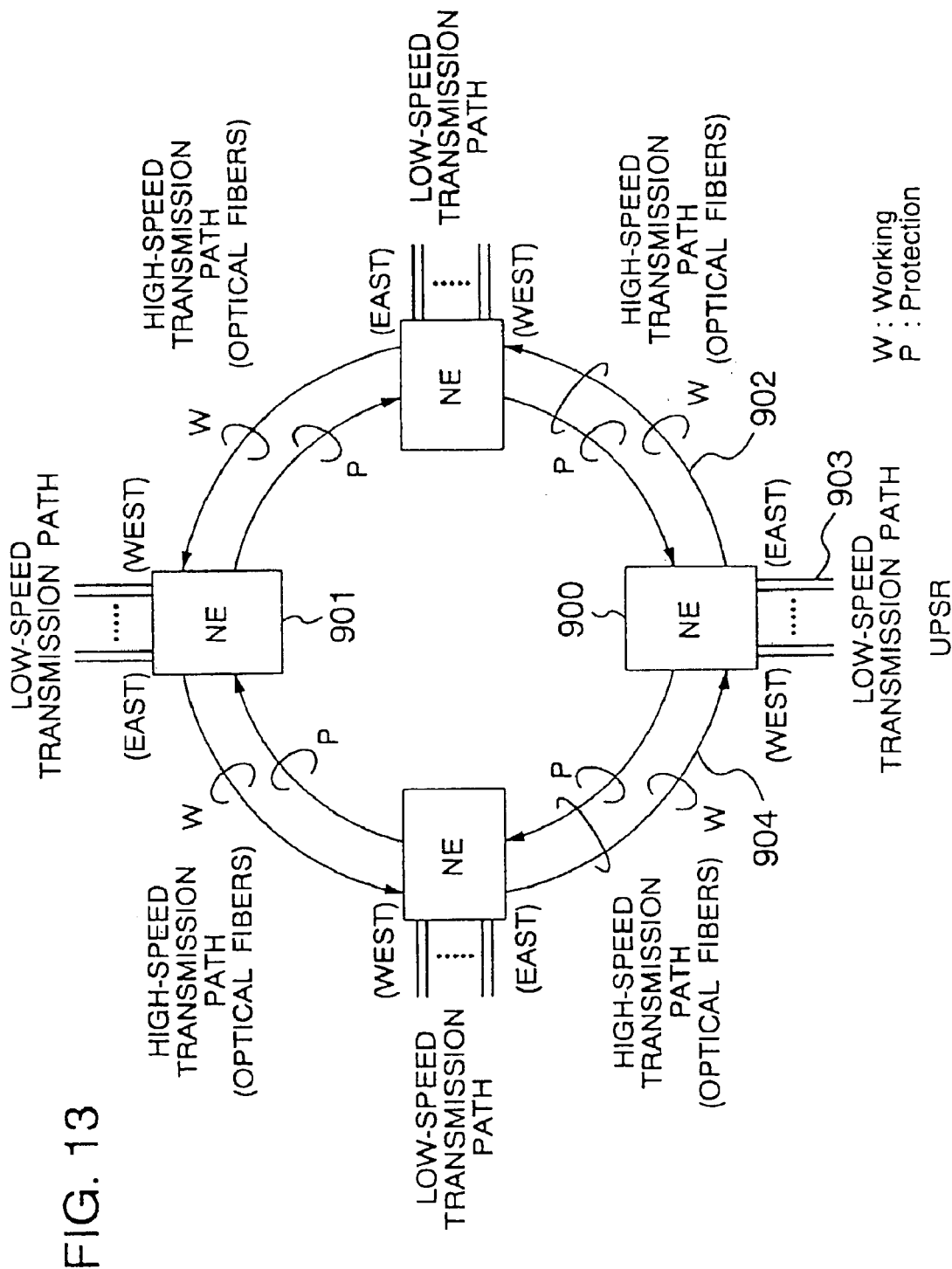
FIG. 13 is a diagram showing a UPSR network.
Figure 14:
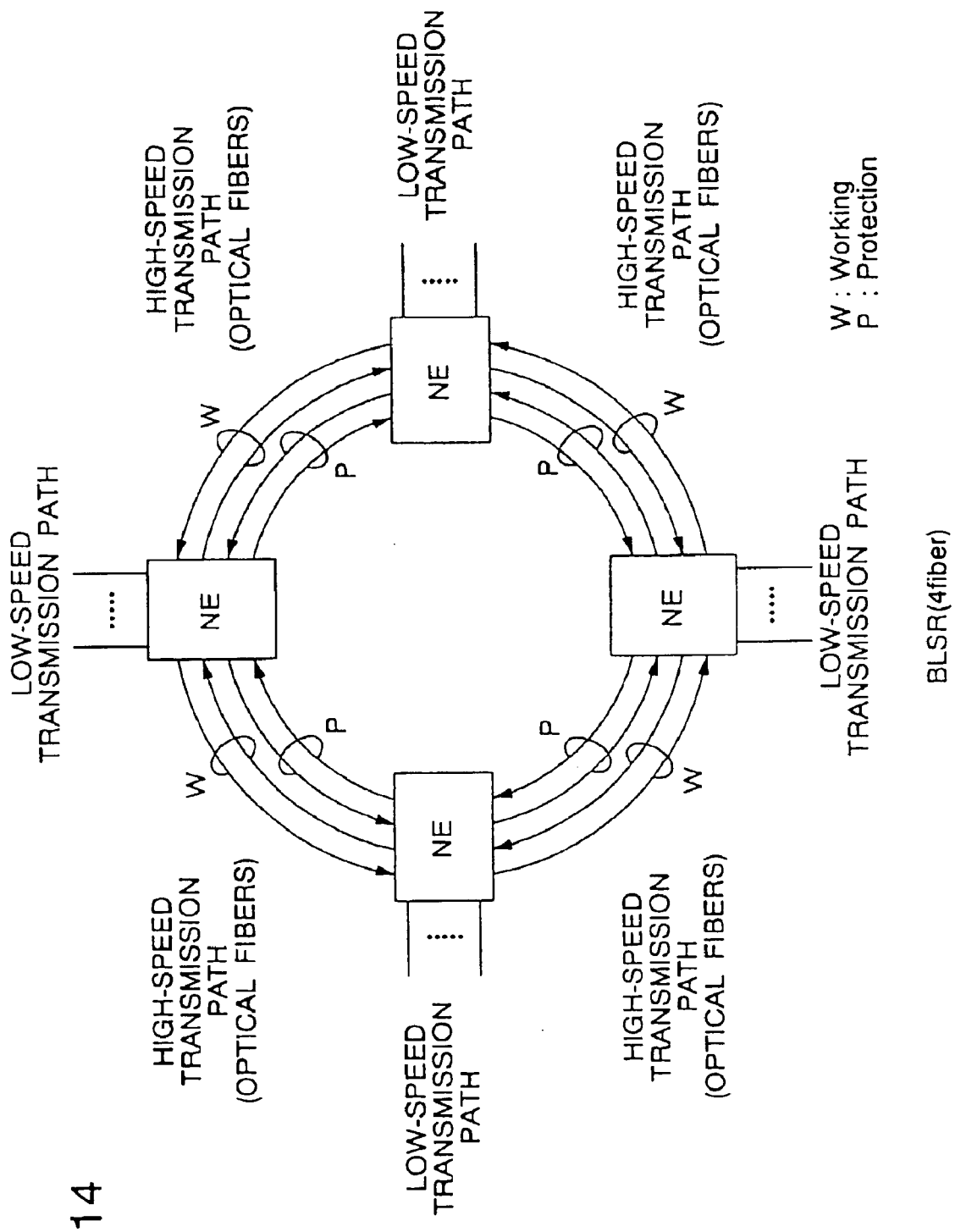
FIG. 14 is a diagram showing a 4-fiber BLSR network.

FIG. 11 shows the manner in which multiplex conversion units are applied to a TM network, FIG. 12 the manner in which multiplex conversion units are applied to the LADM network, and FIGS. 13 and 14 the manner in which multiplex conversion units are applied to the ring network.

In each diagram, NE designates a multiplex conversion unit, W (Working) designates a high-speed transmission path used as an active system, and P (Protection) a high-speed transmission path used as a stand-by system. The difference between the ring network in FIG. 13 and the ring network in FIG. 14 lies in the self-healing scheme. The ring in FIG. 13 is called the Unidirectional Path Switched Ring (UPSR), while the ring in FIG. 14 called the Bidirectional Line Switched Ring (BLSR). The BLSR network includes a 4-fiber BLSR configured as shown in FIG. 14, and a 2-fiber BLSR which is not provided with the two stand-by high-speed transmission paths shown in FIG. 14 and so configured as to use one half of the time slots of two high-speed transmission paths in opposite directions as an active system and the remaining half thereof as a stand-by system.

The functions required of a multiplex conversion unit applicable to all the networks of various types described above are roughly divided into (1) add/drop multiplex (ADM) function, (2) TSA (Time Slot Assignment) function, (3) TSI (Time Slot Interchange) function, (4) path switch function, and (5) line switch function.

Figure 15:
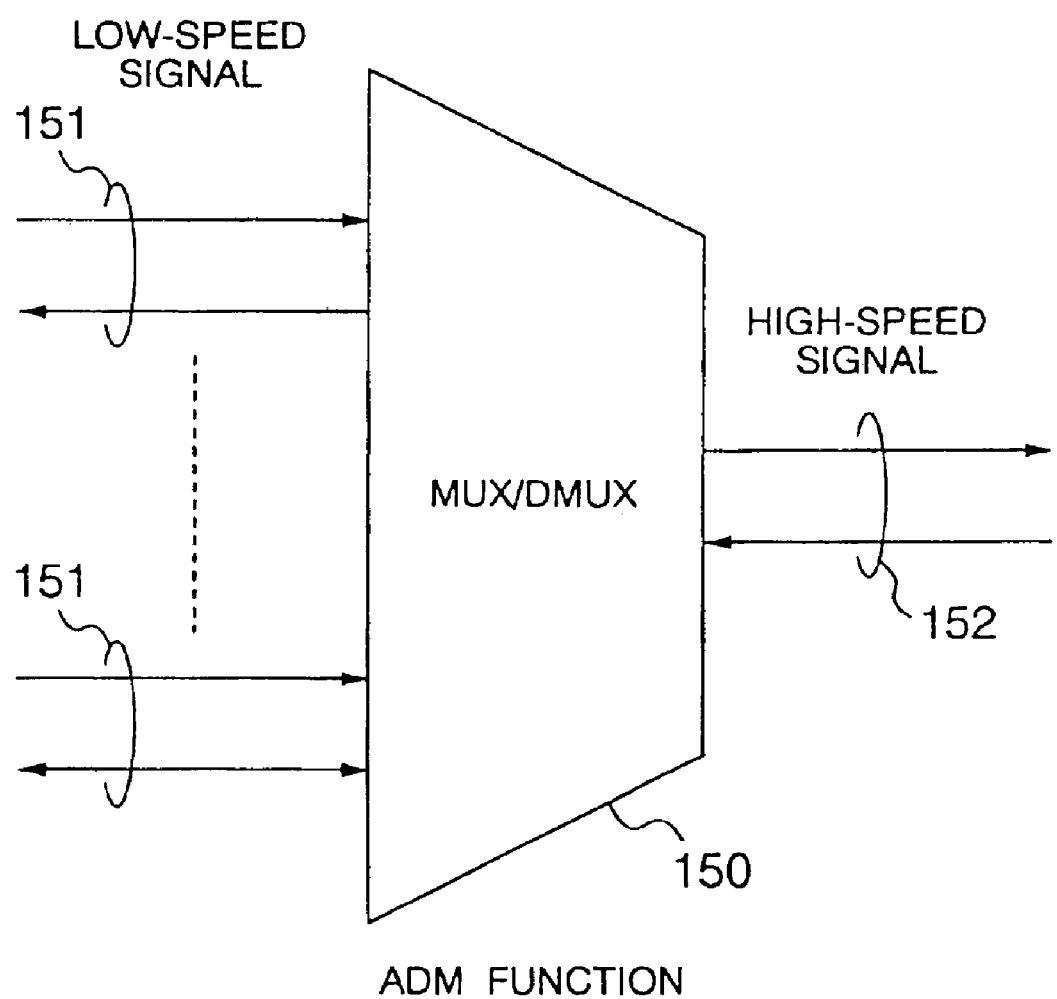
FIG. 15 is a diagram schematically showing the multiplex/demultilplex functions.

The ADM function of (1) above is the one in which, as shown in FIG. 15, an ADM section 150 multiplexes a plurality of low-speed signals on a plurality of low-speed transmission paths 151 and transmits them as signals assigned in the time slots on a high-speed transmission path 152 in time division, or demultiplexes the signals assigned in time slots on the high-speed transmission path 152 and transmits them on a plurality of the low-speed transmission paths 151.

Figure 16:
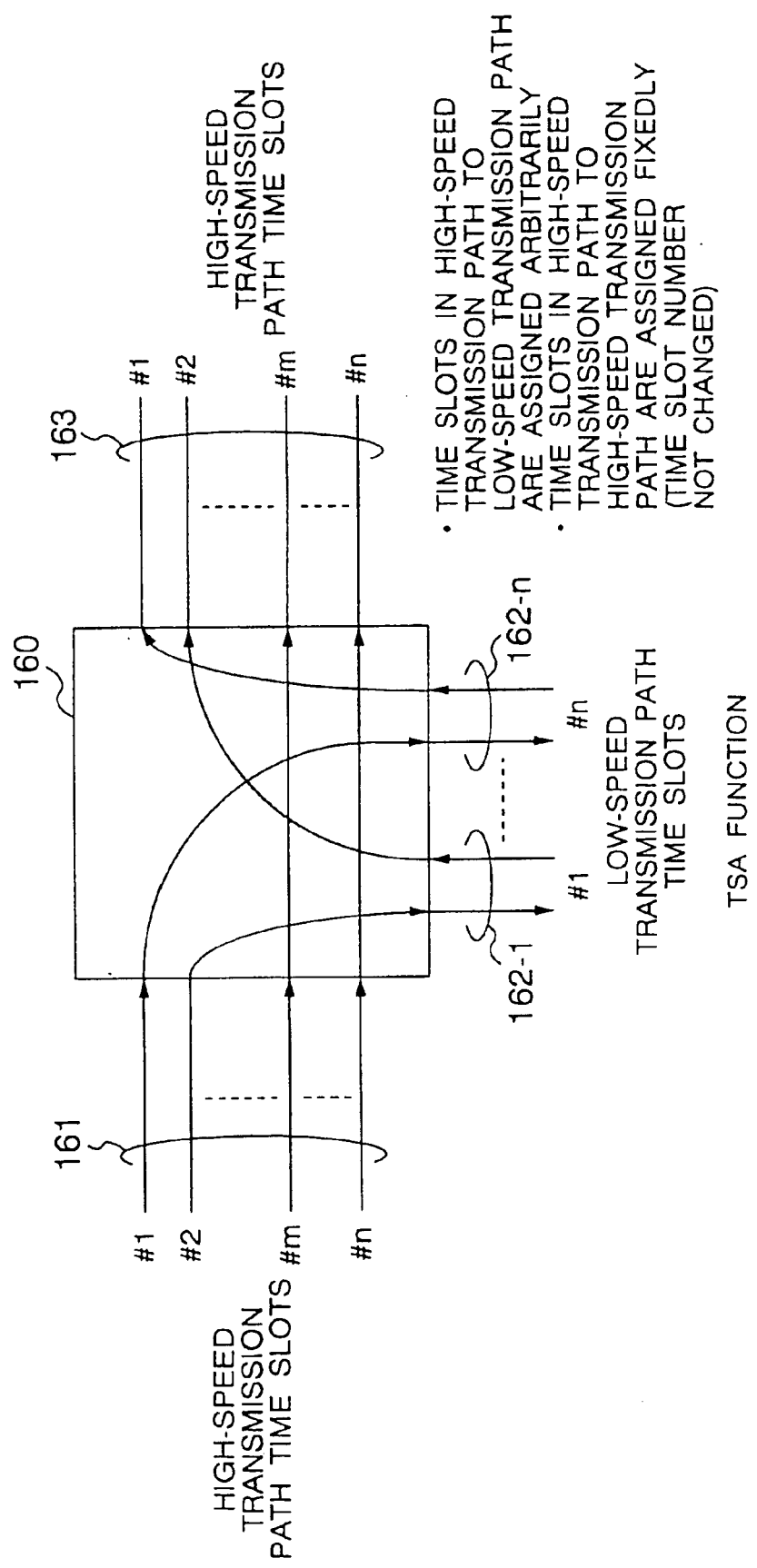
FIG. 16 is a diagram schematically showing the TSA function.

In the TSA function of (2), which is based on the ADM function, as shown in FIG. 16, a TSA section 160 is capable of assigning time slots on one or a plurality of high-speed transmission paths (161 or 163) arbitrarily to low-speed transmission paths (162-1 to 162-n). The TSA function also includes the function of relaying a high-speed signal in a given time slot on a given high-speed transmission path 161 to a time slot of the same time-slot number of a high-speed signal on the other high-speed transmission path 163. In the TSA function, for example, the signal in a part of the time-slots on the west-side high-speed transmission path 904 in the multiplex conversion unit of FIG. 13 is relayed directly to the corresponding time slots on the east-side high-speed transmission path 902. The signals in the remaining time slots (those assigned to the low-speed transmission paths) on the west-side high-speed transmission path 904, on the other hand, are converted into low-speed signals and transmitted to the low-speed transmission paths 903 assigned to the time slots. Also, each low-speed signal transmitted from each low-speed transmission path 903 to the multiplex conversion unit 900 is transmitted in the time slots assigned to each low-speed transmission path of the east-side high-speed transmission path 902.

Figure 17:
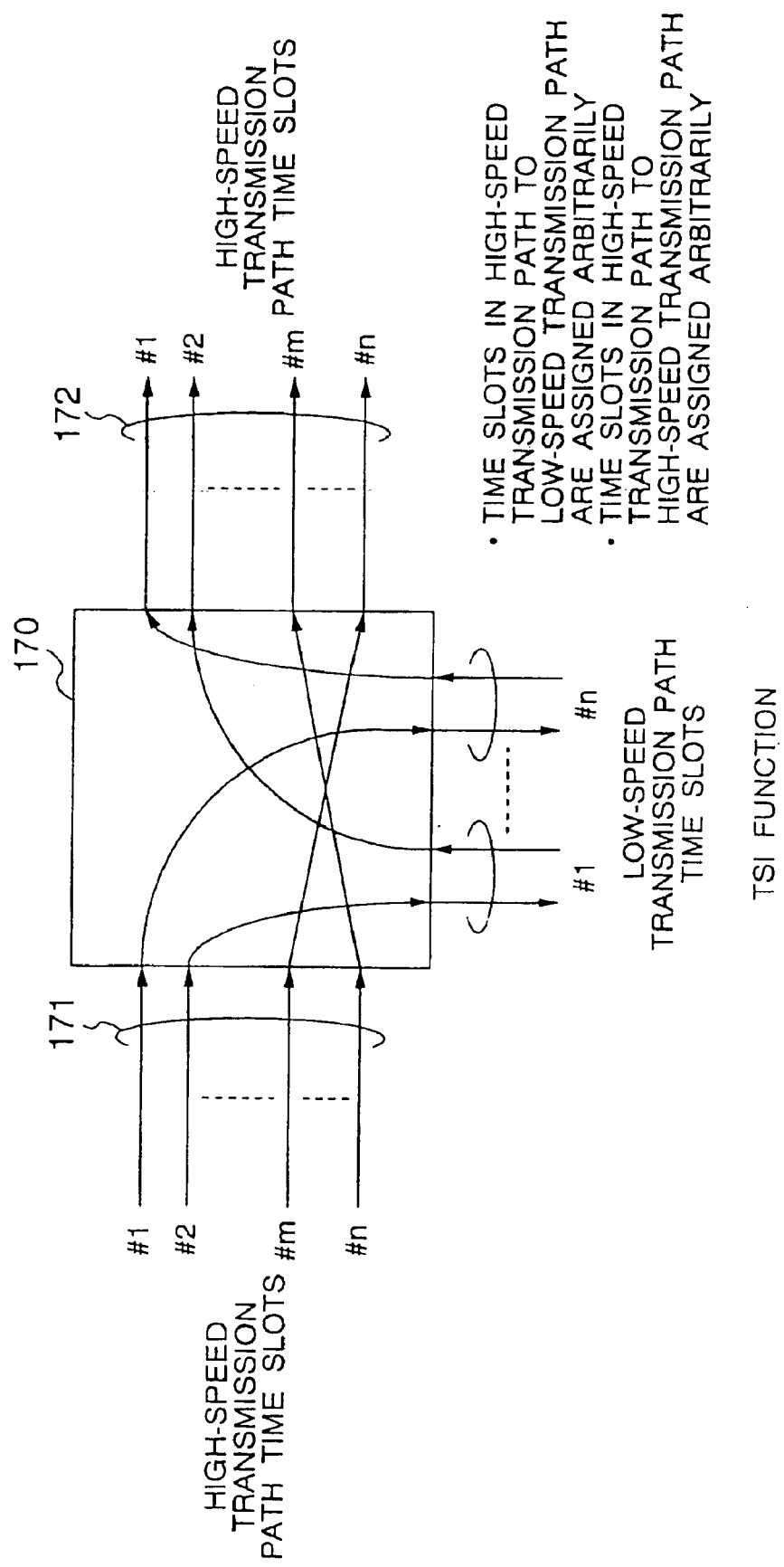
FIG. 17 is a diagram schematically showing the TSI function.

Next, the TSI of (3) above, in addition to the TSA function, has the function of exchanging signals between time slots of different slot numbers on two or more high-speed transmission paths as shown in FIG. 17. A TSI section 170 is for switching signals from the time slot #m of an active system on a high-speed transmission path 171, for example, to the time slot #n of an active system on another high-speed transmission path 172. The TSI function is necessary for realizing the line switch function for switching the signal from a time slot of an active system on a given high-speed transmission path to a time slot of a stand-by system on another high-speed transmission path at the time of self-healing. The TSI function, therefore, is essential for a 2-fiber BLSR network having such a configuration that one half of the time slots on two high-speed transmission paths in opposite directions is used for the active system and the remainder for the stand-by system.

The path switch function described in (4) above, on the other hand, is for selecting a high-speed transmission path on an active system or a stand-by system as an effective path for transmitting signals on a low-speed transmission path through a high-speed transmission path.

Figure 18:
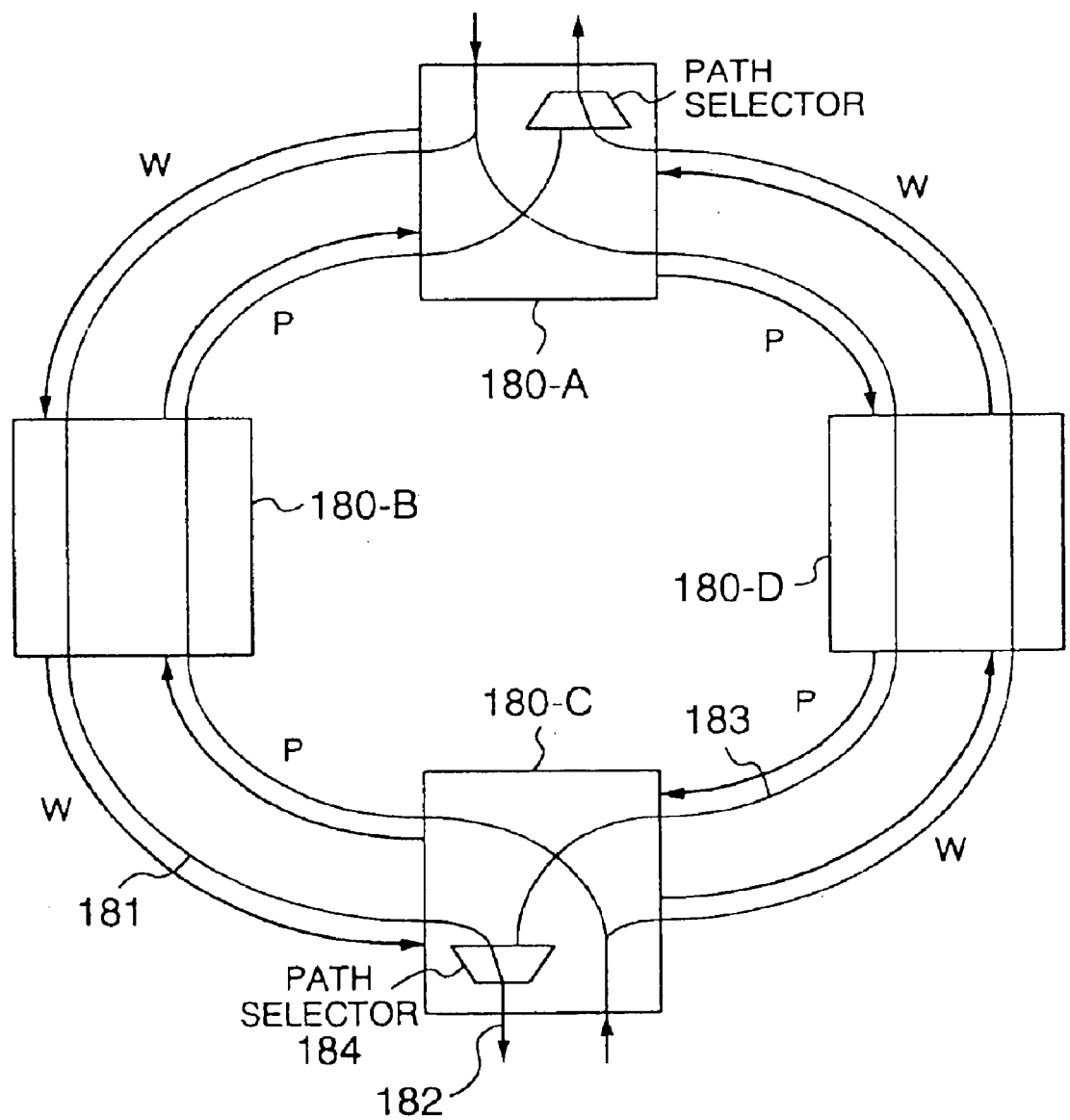
FIG. 18 is a diagram showing signal paths in the UPSR network.

As shown in FIG. 18, among the multiplex conversion units 180-A to 180-D of the UPSR network, for example, the multiplex conversion unit 180-A sends out the signal received from a low-speed transmission path to both the high-speed transmission path of the active system W and the high-speed transmission path of the stand-by system P using time slots on each high-speed transmission path assigned to the particular low-speed transmission path. In this case, the mass of time slots assigned to each low-path transmission path corresponds to a channel in each high-speed transmission path of the active system and the stand-by system. In other words, a channel for transmitting the signal of a low-speed transmission path through a high-speed transmission path exists in each of the high-speed transmission paths of the active system W and the stand-by system P.

Under normal conditions, each multiplex conversion unit sends a signal on a high-speed transmission path (say, 181) of the active system W, demultiplexed from the time slots assigned to a low-speed transmission path, to a low-speed transmission path (say, 182) by means of the TSA function. Also, the signal on a high-speed transmission path (say, 183) of the stand-by system P, contained in the time slots assigned to a low-speed transmission path, is discarded by the path selector 184. In this case, therefore, a high-speed transmission path existing on the active system W is selected as an effective path of signals for each low-speed transmission path.

Figure 19:
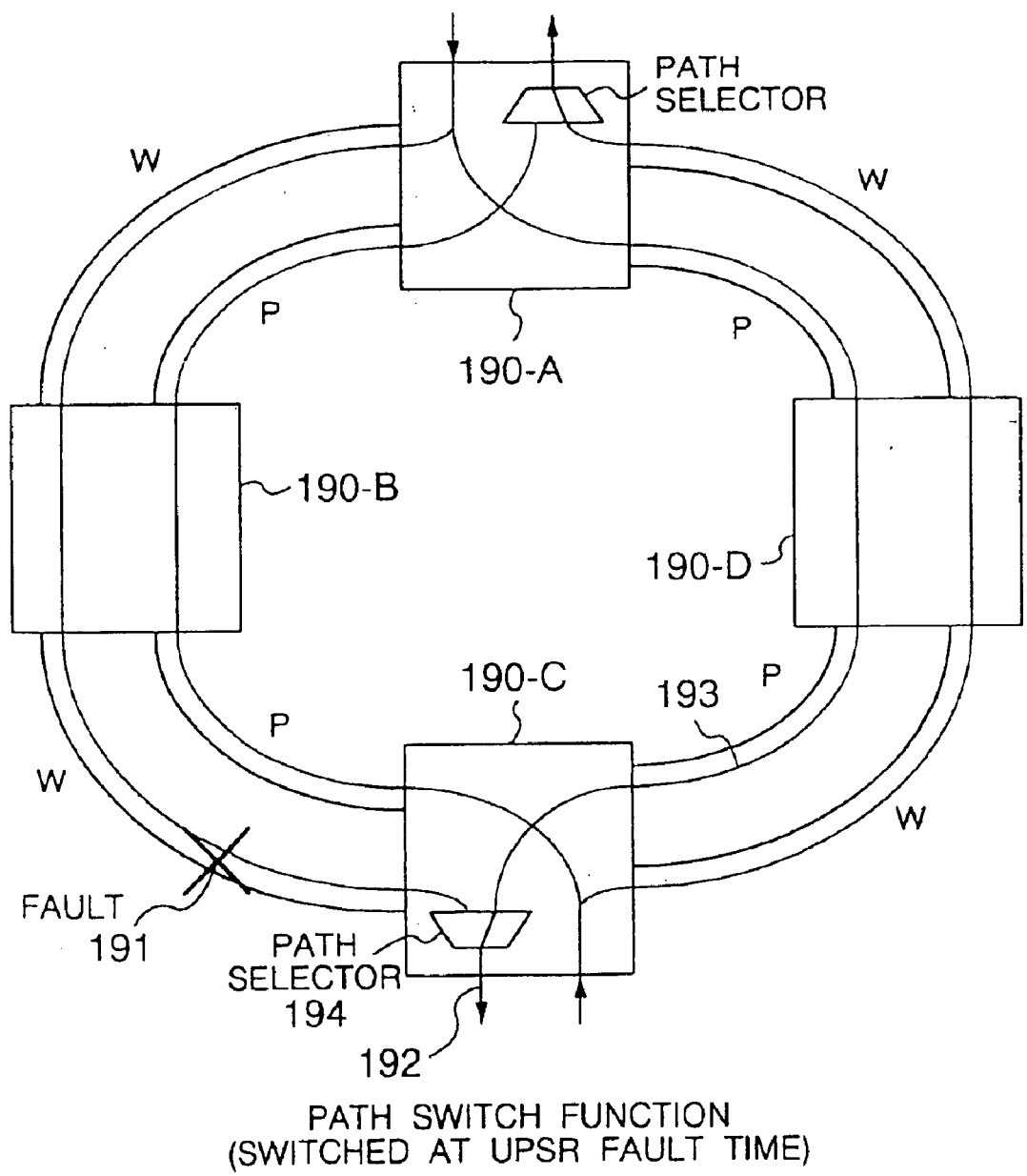
FIG. 19 is a diagram showing signal paths switched at the time of self-healing in the UPSR network.

In the case where there occurs a fault in a high-speed transmission path 191 of the active system W, on the other hand, as shown in FIG. 19, the multiplex conversion unit 190-C containing the low-speed transmission path 192 that receives a signal from the path 191 associated with the particular fault sends out to the low-speed transmission path 192 a signal selected by the path selector 194 and demultiplexed from the time slots associated with the high-speed transmission path 193 of the stand-by system P but not from the time slots associated with a high-speed transmission path of the active system W.

Figure 20:
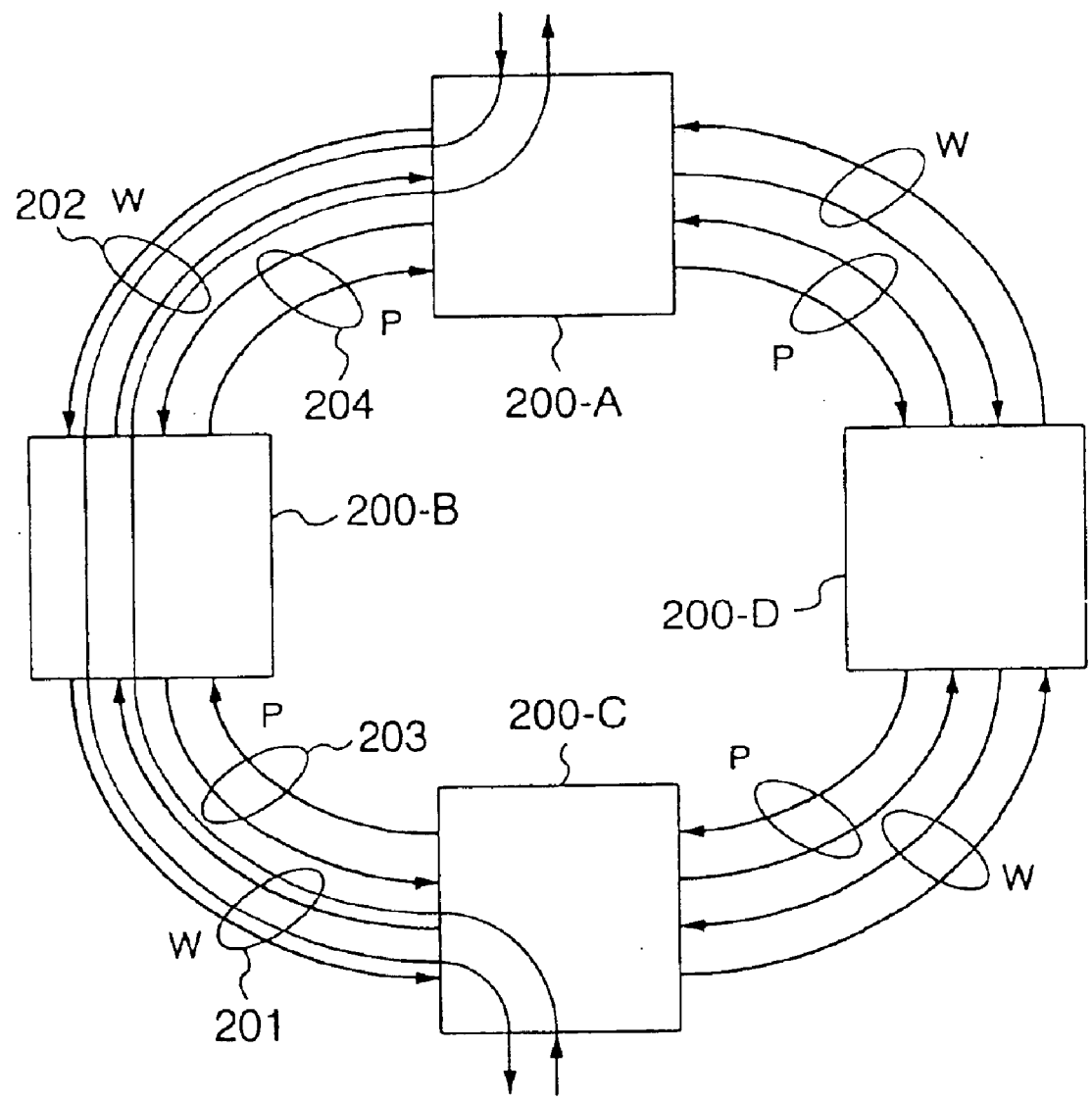
FIG. 20 is a diagram showing signal paths in the 4-fiber BLSR network.
Figure 21:
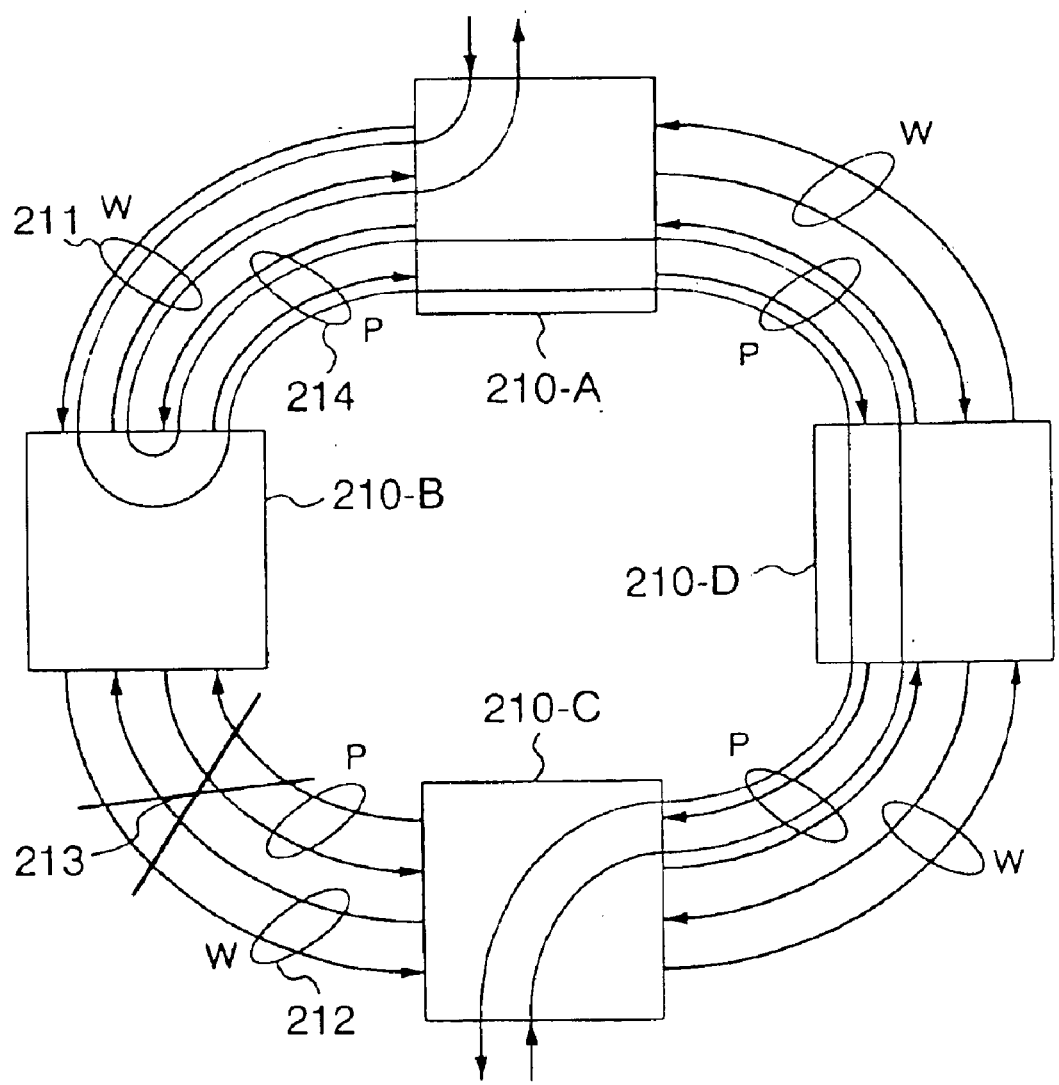
FIG. 21 is a diagram showing signal paths after line switching at the time of self-healing in the 4-fiber BLSR network.

Finally, the line switch function described in (5) above is for switching from normally-used high-speed transmission paths 201, 202 of the active system W to high-speed transmission paths 203, 204 of the stand-by system P at the time of self-healing, as shown in FIG. 20. In addition to the line-replacing function in which the high-speed transmission paths in use are simply switched, the line switch function includes the line switch function as shown in FIG. 21. In FIG. 21, assume that under normal conditions the signal is exchanged between a time slot on a high-speed transmission path 211 of the active system and a time slot on another high-speed transmission path 212 of the active system which is assigned a specific slot number. At the time of self-healing when a fault 213 occurs, the signal is exchanged between a time slot on the high-speed transmission path 211 of the active system and a time slot on another high-speed transmission path 214 of the stand-by system which is assigned a slot number different from the above-mentioned specific slot number. In this way, the line switch function (5) includes the line switch function of time slot interchange type in which a high-speed transmission path in use is switched. This line switch function of time slot interchange type is essential to the 2-fiber BLSR network in which one half of the time slots on two high-speed transmission paths in opposite directions is used for the active system and the remaining half of the time slots for the stand-by system. Also, this line switch function of time slot interchange type requires the TSI function described above.

Figure 10:
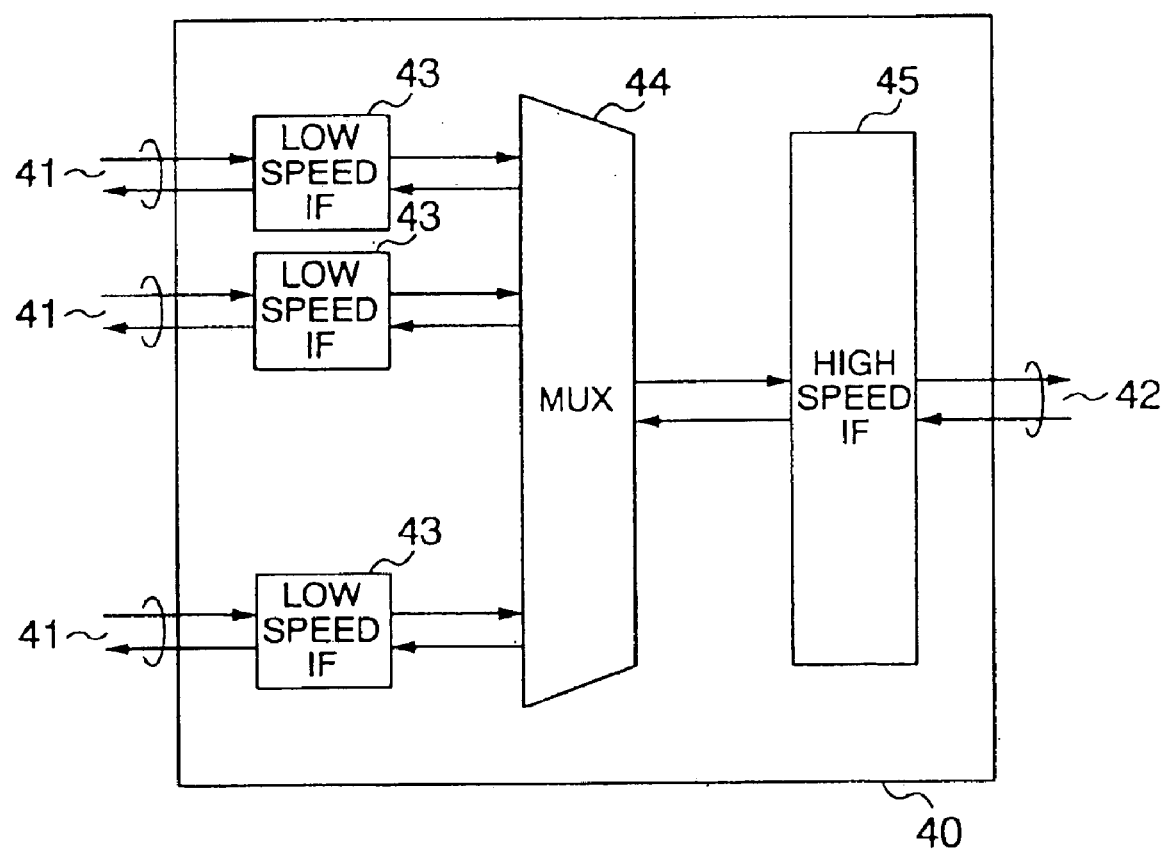
FIG. 10 is a diagram showing a basic configuration of a typical multiplex conversion unit.
Figure 22:
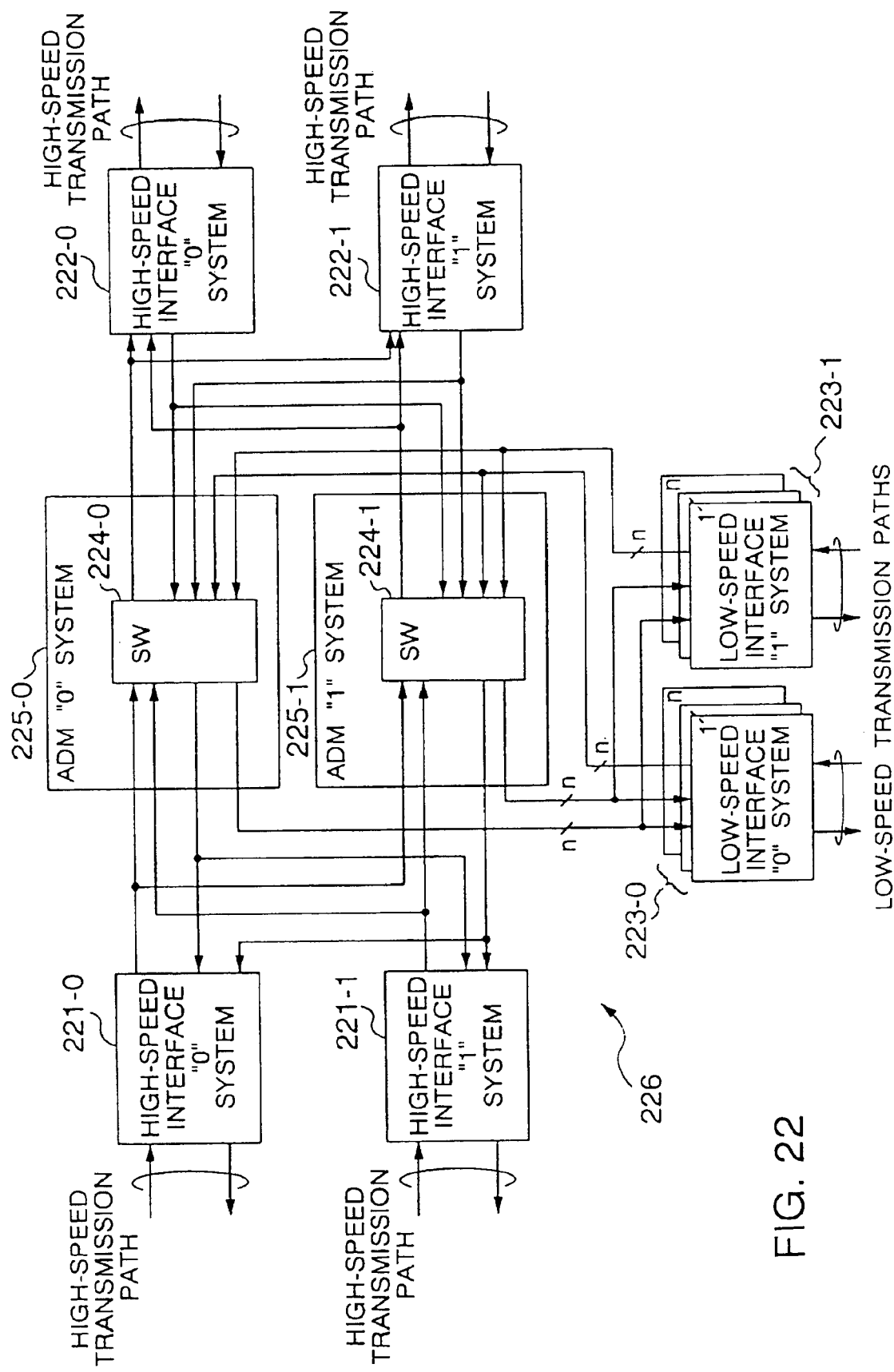
FIG. 22 is a diagram showing a configuration of multiplex conversion units applicable to all of the 4-fiber BLSR, 2-fiber BLSR, LADM, UPSR and TM networks assumed to be configured according to the basic functions of multiplex conversion units.

A multiplex conversion unit having these functions is considered to have a configuration as shown in FIG. 22 based on the basic configuration shown in FIG. 10.

The multiplex conversion unit shown in FIG. 22 includes as many high-speed interface sections as the high-speed transmission paths required to be contained in the particular multiplex conversion unit and as many low-speed transmission interface sections as the low-speed transmission paths required to be contained in the particular multiplex conversion unit. FIG. 22 shows the case in which the multiplex conversion unit is applied to the 4-fiber BLSR network. Dual low-speed transmission paths are configured for the active system (0-system) and the stand-by system (1-system). The multiplex conversion unit 226 includes ADM sections 225-0, 225-1 having switches 224-0, 224-1, respectively, for exchanging signals between high-speed interface sections 221-0, 221-1, 222-0, 222-1 an a low-speed interface sections 223-0, 223-1. In the configuration of FIG. 22, two ADM sections are incorporated for assuring an improved reliability. The two high-speed transmission paths on one side of the 4-fiber BLSR, however, are configured of two sets of two optical fibers for transmitting signals in opposite directions at physical level. Also, in the configuration shown in FIG. 22, the high-speed interface sections and the low-speed interface sections can be reduced in number depending on the number of the high-speed transmission paths and the low-speed transmission paths required to be contained in the network to which the multiplex conversion unit 220 is applied.

In this multiplex conversion unit 226, the switches 224-0, 224-1 of the ADM sections 225-0, 225-1 are required to have all the functions described above. Especially, the TSI function is required for executing various exchange operations. These switches are inevitably increased in scale, and therefore, the multiplex conversion unit 226 becomes expensive.

It is not economical, however, to use the high-cost, large-scale multiplex conversion unit for the TM or UPSR network applications requiring no TSI function.

The present inventors have analyzed as follows the relation between various types of networks and the above-mentioned functions required of the multiplex conversion unit for realizing such networks.

Specifically, the line switch function, which is characterized by the self-healing scheme, is essential for the BLSR network. The line switch function is also necessary for the self-healing process in which a high-speed transmission path of the stand-by system is used in place of a high-speed transmission path of the active system that has encountered a fault in the TM or LADM network. The line switch function of the line-replacing type is provided for the 4-fiber BLSR, TM or LADM network, and the line switch function of the time slot interchange type for the 2-fiber BLSR network.

Realization of the line switch function of time, slot interchange type requires the TSI function, and the TSI function is essential for the 2-fiber BLSR network which is configured to use one half of the time slots on two high-speed transmission paths in opposite directions for the active system and the remaining half of the time slots for the stand-by system.

The line switch function of the line-replacing type for the LADM or the 4-fiber BLSR network is achieved by changing the destination or the source of all the time slots exchanged on the related high-speed transmission paths in the same manner as when the high-speed transmission path providing the signal destination or the signal source is changed, and therefore can also be realized by using the TSI function. Further, provision of the TSI function instead of the TSA function for the LADM or the 4-fiber BLSR network makes possible versatile utilization of the high-speed transmission paths. Further, in order to share a configuration with the 2-fiber BLSR network, the TSI function is desirable for the 4-fiber BLSR network or the LADM network subjected to self-healing.

The TSA function, on the other hand, is indispensable for the LADM or the 4-fiber BLSR network lacking the TSI function. The TSA function is also essential for the UPSR network.

Also, the ADM function is indispensable for the TM network.

The path switch function is characterized by performing the self-healing scheme by switching the paths, and is essential for the UPSR network. The line switch function of line-replacing type for the TM network, on the other hand, is achieved by switching all the high-speed transmission paths of the active system to the high-speed transmission paths of the stand-by system by the path switch function. As a result, realization of the line switch function of line-replacing type for the TM network using the path switch function is desirable for achieving a shared configuration.

On the basis of the analysis described above, the present inventors have reached the following conclusion on the relation between the form of network and the configuration of the multiplex conversion unit.

The TSI function and the line switch function of time slot interchange type using the TSI function are essential for the multiplex conversion unit applied to the 2-fiber BLSR network.

On the other hand, the line switch function of line-replacing type is indispensable for the multiplex conversion unit applied to the 4-fiber BLSR network. It is also desirable to use the TSI for the line switch function of line-replacing type.

The line switch function of line-replacing type is desirable for the multiplex conversion-unit applied to the LADM network. The line switch function of line-replacing type also desirably uses the TSI function.

The path switch function and the TSA function are essential for the multiplex conversion unit applied to the UPSR network.

For the multiplex conversion unit applied to the TM network, the ADM function is essential. Such a multiplex conversion unit desirably include switch function and desirably uses the path function in performing the line switch function line-replacing type.

Further, as obvious from the foregoing description, the function block having the TSA function inherently has the ADM function, while the function block with the TSI function inherently has the TSA function.

Bearing the above-mentioned analysis and conclusion in mind, the inventors provide the following-described configuration of a multiplex conversion unit in order to achieve the above-mentioned object.

Specifically, four types of circuit packs are prepared, including a high-speed interface circuit pack, a low-speed interface circuit pack, an ADM circuit pack and a connection circuit pack.

The low-speed interface circuit pack, which, accommodated one or a plurality of low-speed transmission lines, includes an output section for supplying a plurality of high-speed interface circuit packs with a low-speed signal containing one or a plurality of time slots received from the particular low-speed transmission lines, and a path switch section in which one of the low-speed signals input from the high-speed interface circuit packs is selected for each time slot as a low-speed signal transmitted to one or a plurality of the low-speed transmission lines.

The high-speed interface circuit pack, which accommodates the high-speed transmission lines, is adapted to output/input line signals each including a predetermined number of time slots exchanged with the accommodated high-speed transmission lines, line signals input/output by other high-speed interface circuit packs and low-speed signals input/output by a plurality of low-speed interface circuit packs. The high-speed interface circuit pack includes a first TSA function between a plurality of line signals received from the accommodated high-speed transmission lines and output to other high-speed interface circuit packs and the output low-speed signals, and a second TSA function between the line signals input from other high-speed interface circuit packs and transmitted to the accommodated high-speed transmission lines and the low-speed signals.

The ADM circuit pack is adapted to output/input the line signals input/output by a plurality of high-speed interface circuit packs and the low-speed signal containing one or a plurality of time slots input/output by a plurality of low-speed interface circuit packs. The ADM circuit pack includes a TSI (time slot interchange) section having the TSI function between a plurality of line signals and a plurality of low-speed signals, and a line switch section having a first line switch function for switching line signals to be processed by the TSI section and a second line switch function for switching the time slots of the line signal to be processed by the TSI section using the TSI function or the TSI section.

The connection circuit pack is adapted to input/output the low-speed signals input/output by the high-speed interface circuit packs as the low-speed signals input/output by other high-speed interface circuit packs. The multiplex conversion unit includes an arbitrarily selected one of first and second modes as described below.

In the first mode, a plurality of high-speed interface circuit packs and a plurality of low-speed interface circuit packs are connected to each other in such a manner that the low-speed signals input/output by the high-speed interface circuit packs are input/output as the low-speed signals input/output by another high-speed interface circuit pack through the connection circuit pack.

In the second mode, the TSA section of the high-speed interface circuit packs performs the ADM function to convert the line signals exchanged with the high-speed transmission lines directly to a plurality of output/input low-speed signals. Also, with the connection circuit pack replaced by an ADM circuit pack in the first mode, the high-speed interface circuit packs and the low-speed interface circuit packs are connected to the ADM circuit pack in such a manner that a plurality of low-speed signals input/output by a plurality of high-speed interface circuit packs are output/input by the ADM circuit pack as line signals output/input by the high-speed interface circuit packs, and the low-speed signals input/output by the ADM circuit pack are output/input by the low-speed interface circuit packs as the low-speed signals output/input by the low-spedd interface circuit packs.

According to the invention, the connection circuit pack and the ADM circuit pack are input/output by the same signal as the high-speed interface circuit pack and the low-speed interface circuit pack, respectively (with the same interface between the high-speed interface circuit pack and the low-speed interface circuit pack). Therefore, the connection circuit pack and the ADM circuit pack are interchangeable with each other. Consequently, by selecting the connection circuit pack or the ADM circuit pack for use with the multiplex conversion unit, it is possible to configure either a multiplex conversion unit not including a function block having the TSI function and applicable to the TM or UPSR network, or a multiplex conversion unit including an ADM circuit pack applicable to the BLSR or LADM network.

Now, an embodiment of the invention will be explained with reference to an application thereof to a network based on SONET (Synchronous Optical Network).

First, a first embodiment of the invention, will be described.

SONET is a protocol announced by Bellcore, U.S.A. employing a synchronous transmission system in which a high-order level signal is obtained simply by synchronous octet multiplexing of-the STS-1 level signal based on the 50 Mbit/s signal (STS-1 level signal). A standard for this SONET is ITU-T's SDH (Synchronous Digital Hierarchy).

In SONET, the STS-1 level signal multiplexed by N (i.e., the signal of n×50 Mbit/s) is called the STS-N level signal, and the STS-N level signal converted into a signal for optical fiber transmission is called the OC-N signal. The signals of STS-1 level and STS-N level are transmitted in the form stored in a frame corresponding to each level.

Now, according to this embodiment, a plurality of circuit packs are combined to constitute a multiplex conversion unit. The types of circuit pack used in this embodiment include the OC-121F circuit pack corresponding to the high-speed interface section of the multiple conversion unit shown in FIG. 22, the ADM circuit pack corresponding to the ADM section, the DS31F circuit pack corresponding to the low-speed interface section and the THRU circuit pack only for repeating the signal line. The component parts of the multiplex conversion unit shown in FIG. 22 and the circuit packs corresponding to the respective parts, however, have partially different functions as described below.

Figure 23:
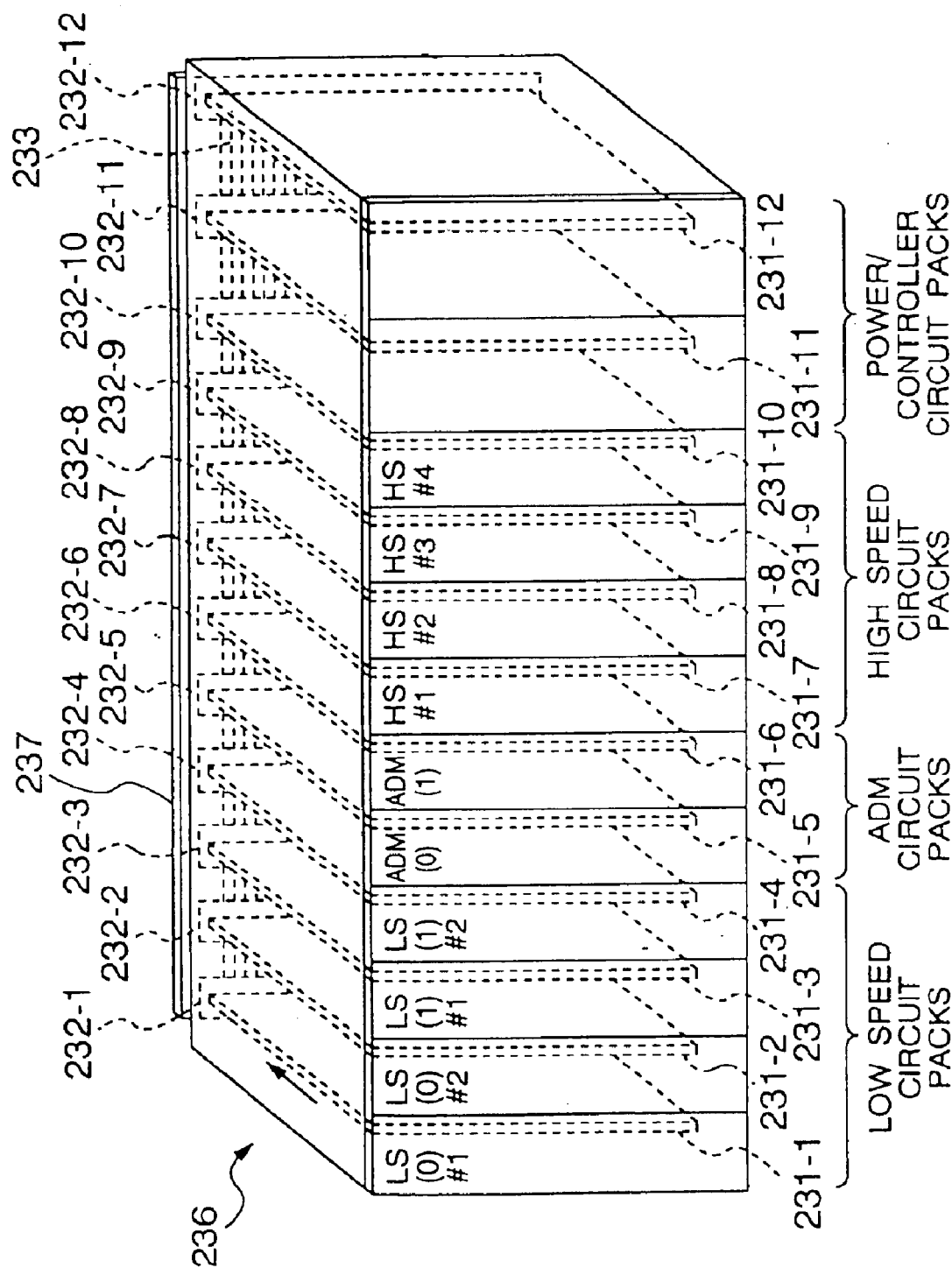
FIG. 23 is a perspective view showing an example of a multiplex conversion unit configured with a plurality of circuit packs.

Each circuit pack according to this embodiment, as shown in FIG. 23, is used by being mounted in slots 232-1 to 232-12 of a predetermined shelf 236 in the direction shown by arrow. The shelf 236 includes a plurality of slots 232-1 to 232-10 on a backplane 237 for inserting the circuit packs 231-1 to 231-12, a signal line 233 formed on the backplane 237 for connecting the slots in such a manner as to connect the circuit packs 231-1 to 231-10 inserted into the slots as shown in FIGS. 1, 7, 8 and 9, and power supply circuit packs 231-11 to 231-12 for supplying power to the circuit packs 231-1 to 231-10. The same interface is provided between the slots of the circuit packs of the same type. Also, the ADM circuit pack and the THRU circuit pack have the same slot interface configured to allow selected ones of them to be inserted. According to this embodiment, the shelf is provided with four slots for the OC-12IF circuit pack, two slots for the ADM/THRU circuit pack and eight slots for the DS3IF circuit pack (four slots are shown in FIG. 23 for facilitating understanding).

First, explanation will be made about the configuration of a multiplex conversion unit applied to the 4-fiber BLSR network. In the description that follows, reference is made to the case in which the OC12 high-speed transmission path is used for transmitting OC-12 signals (600 Mb/s). The two OC-12 high transmission paths for transmitting signals in opposite directions, however, are realized by a single optical fiber at the physical level.

Figure 1:
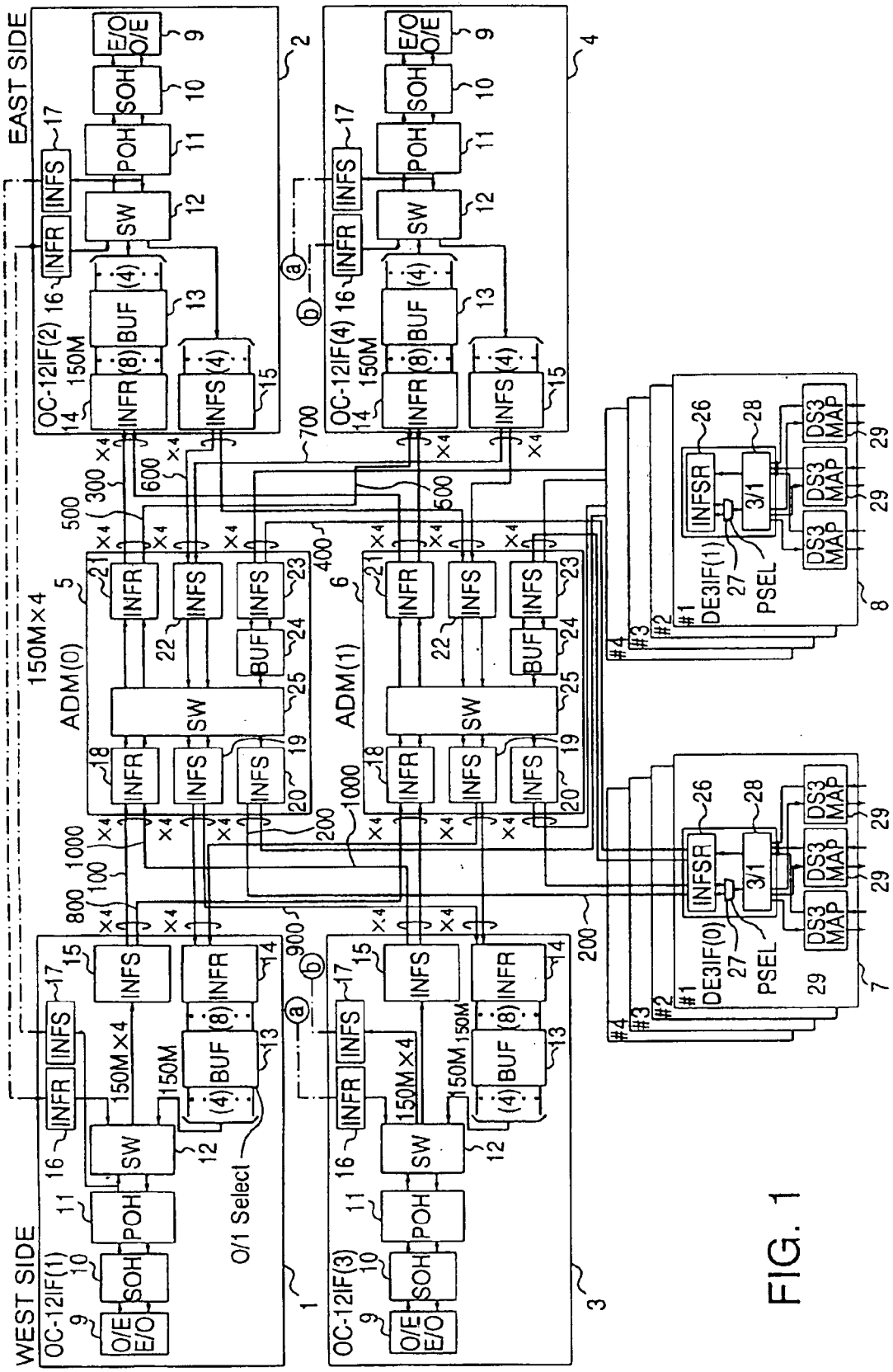
FIG. 1 is a diagram showing a configuration of multiplex conversion units applicable to a 4-fiber BLSR network according to an embodiment of the present invention.

FIG. 1 shows a configuration of a multiplex conversion unit applied to the 4-fiber BLSR network.

In FIG. 1, numerals 1, 2, 3, 4 designate OC-12IF circuit packs, numerals 5, 6 ADM circuit packs, and numerals 7, 8 DS3IF circuit packs.

The OC-12IF circuit packs 1 to 4 are responsible for interfacing with an OC-12 high-speed transmission line (a bidirectional line formed by two OC-12 high-speed transmission paths for transmitting signals in opposite directions). In the case of the 4-fiber BLSR network, the circuit packs 1, 3 are required for the west side to be connected to a first adjacent multiplex conversion unit through the OC-12 high-speed transmission path on the network, while the circuit packs 2, 4 are required for the east side which is connected to a second adjacent multiplex conversion unit through the OC-12 high-speed transmission path. Twelve 50-Mb/s channels for transmitting 12 STS-1 level signals are provided by time division on each OC-12 high-speed transmission path. The 50-Mb/s channels for transmitting the STS-1 level signals will hereinafter be called the STS-1 channels. The STS-1 channel corresponds to the path providing a unit of the path switching described above.

Also, the OC-12IF circuit packs 1 to 4 each include an opto-electric conversion module 8, a SOH circuit 10 and a POH circuit 11 for STS-12 performing level frame synchronization and processing overhead (OH) bytes, a SW circuit 12 for making a time slot assignment (TSA) for each STS-1, INFS circuits 15, 17 and INFR circuits 14, 16 for transmitting/receiving 150-Mb/s electrical signals to and from other circuit packs, and a bit buffer circuit BUF 13. The SW circuit 12 for performing TSA is supplied with a signal of 36 STS-1 channels and outputs a signal of 24 STS-1 channels. Specifically, 12 STS-1 channels are input from the POH 12, the INFR 16 and the BUF 13, respectively, and a signal of 12 STS-1 channels is output to the POH 12 and the INFS 15, respectively. According to this embodiment, however, the 12 STS-1 channels input/output between the SW circuit 12, the POH 11 and the INFR 16 are input/output by being multiplexed at degree 12 on a single 600-MHz signal, while the 12 STS-1 channels between the SW circuit 12, the BUF 13 and the INFS 15 are input/output by being multiplexed at degree 3 on four 150-MHz signals.

The set of four 150-MHz signals used in this embodiment is for transmitting a signal of 12 STS-1 channels in a multiplex conversion unit. The 12 STS-1 channels on the set of four 150-MHz signals used in this embodiment, on the other hand, are assigned 12 different channel numbers, corresponding to the 12 channel numbers of the 12 STS-1 channels on the 600-MHz signal. According to this embodiment, this signal line for transmitting the signal of 12 STS-1 channels is called an internal path. The set of four 150-MHz signal lines or the single 600-MHz signal line for transmitting the signal of 12 STS-1 channels is included in an internal path.

The signal of 12 STS-1 channels is transmitted in the set of four 150-MHz signals simply for the convenience of configuring the unit, and other methods may be employed for transmitting the signal of 12 STS-1 channels in the multiplex conversion unit.

The SW circuit 12 is preferably configured to exchange signals between the 36 input STS-1 channels and the 24 output STS-1 channels. According to the present embodiment, signal exchange is not necessarily possible for all the combinations of the 36 input STS-1 channels and the 24 output STS-1 channels. Instead, the SW 12 may be so configured that signal exchange is impossible between the 12 STS-1 channels input from the POH 11 and the 12 STS-1 channels output to the POH 11, between the 12 STS-1 channels input from the BUF 13 and the 12 STS-1 channels output to the INFS 15 and between the 12 STS-1 channels input from the INFR 16 and the 12 STS-1 channels output to the INFS 15.

The ADM circuit packs 5, 6 include a SW circuit 25 for performing the time slot interchange (TSI) for each STS-1, the line switching operation of time slot interchange type for the 2-fiber BLSR network and the line switching operation of line-replacing type for the 4-fiber BLSR and LADM networks described above, INFS circuits 19, 20, 21 and INFR circuits 18, 22, 23 for transmitting/receiving 150-Mb/s electrical signals to and from other circuit packs, and a bit buffer circuit BUF 24. The SW circuit 25 for performing the TSI function is supplied with a signal of 60 STS-1 channels and outputs a signal of 60 STS-1 channels. Specifically, 24 STS-channels are input from each of the INFR circuits 18, 22 and 12 STS-1 channels from the BUF 24, and a signal of 24 STS-1 channels is output to each of the INFS circuits 19, 21, and a signal of 12 STS-1 channels to the INFS circuit 20.

The DS3IF circuit packs 7, 8, on the other hand, include a PSEL circuit for performing path switching for each STS-1 channels an INFSR circuit 26 for transmitting/receiving 150-Mb/s electrical signals to and from other circuit packs, and a 3/1 circuit 28 for converting a 150-Mb/s signal to three 50-Mb/s signals and the other way around, and a DS3MAP circuit 29 for converting between a 50-Mb/s STS-1 level signal and a DS3 signal suitable for interfacing with a low-speed transmission path.

The DS3IF circuit packs 7, 8 include three DS3MAP circuits 29, each having one low-speed transmission line (a bidirectional line configured of two transmission paths for transmitting signals in opposite directions). Consequently, each DS3IF circuit pack contains three low-speed transmission lines. Also, as shown in FIG. 1, the DS3IF circuit packs have a redundant structure of dual systems ("0" and "1" systems), and each system can include a maximum of four DS3IF circuit packs. As a result, the multiplex conversion unit can incorporate a maximum of 12 low-speed transmission lines.

In the above-mentioned configuration, the OC-12IF circuit pack 1 and the OC-12IF circuit pack 2 are connected to an active high-speed transmission line, and the OC-12IF circuit pack 3 and the OC-12IF circuit pack 4 are connected to a stand-by high-speed transmission line. The ADM circuit pack 5 and the DS3IF circuit pack 7 are used actively among the ADM circuit packs 5, 6 and the DS3IF circuit packs 7, 8 having a redundant structure. The ADM circuit pack 6 is used in the case of a fault of the ADM circuit pack 5, while the DS3IF circuit pack 8 is used in the case of a fault of the DS3IF circuit pack 7.

The multiplex conversion unit operates as follows under normal conditions.

Figure 2:
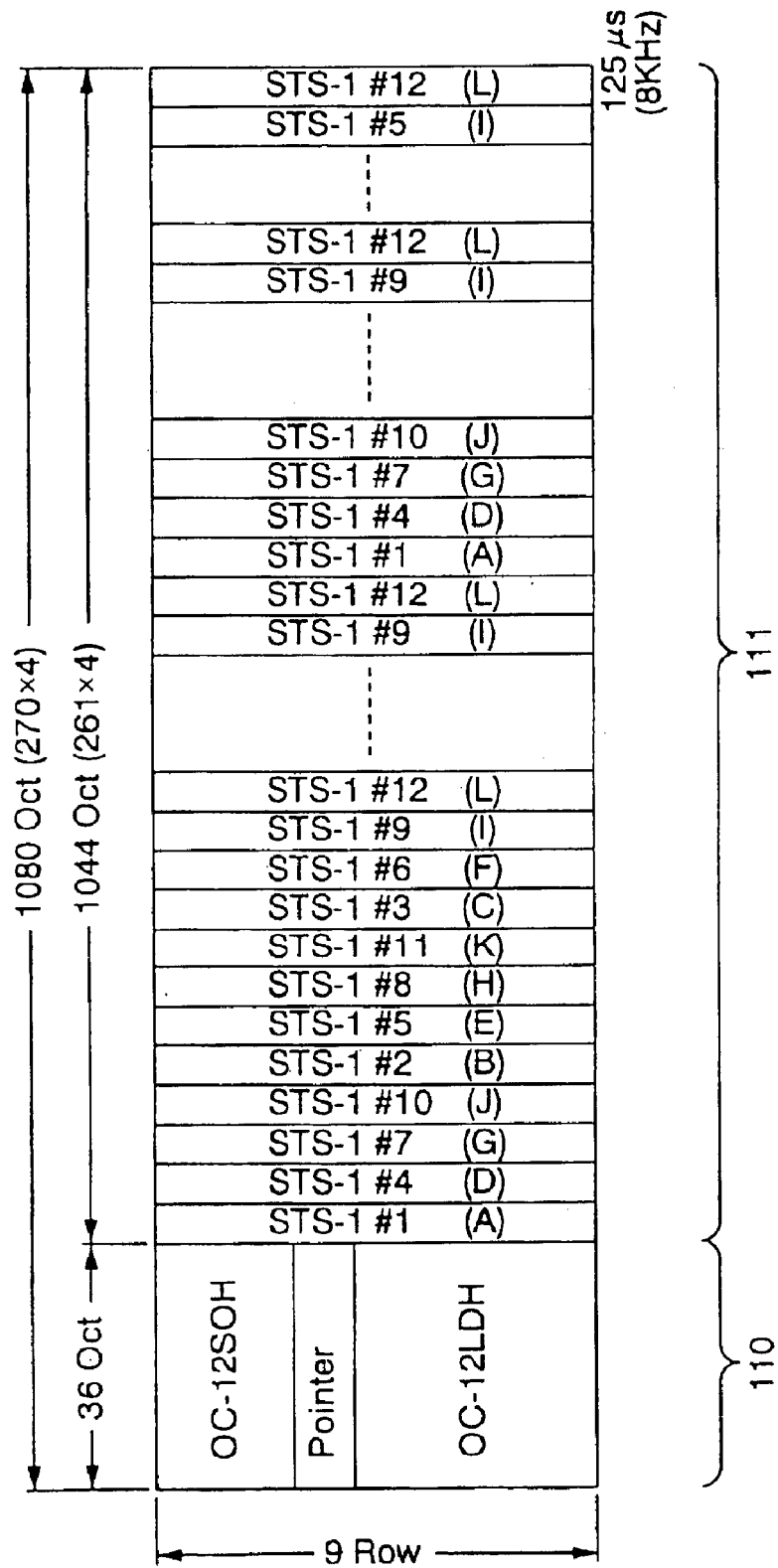
FIG. 2 is a diagram showing a SONET frame.

In the 4-fiber BLSR network, the OC-12 signal that has arrived from the high-speed transmission path of the active system on the west side is received by the OC-12IF circuit pack 1, and converted into an electrical signal by an opto-electric conversion module 9, and the overhead of the SONET frame is processed by the SOH circuit 10 and the POH circuit 11. After that, the payload field of the SONET frame is applied to the SW circuit 12. FIG. 2 shows the SONET frame sent as a SONET frame. In FIG. 2, numeral 110 designates the overhead, and numeral 111 designates the payload field. Also, characters A to L represent the channel numbers of the STS-1 channels for transmitting a STS-1 level signal.

In the case of the 4-fiber-BLSR network, the SW circuit 12 exchanges the signal of 12 STS-1 channels received from the POH circuit 11 directly with the STS-1 channels of the same-channel numbers on the internal path 100 directed to the ADM circuit pack through the INFS 15.

The ADM circuit pack 5 receives the signal of 12 STS-1 channels (four 150 Mb/s signals) on the internal-path 100 from the OC-12IF circuit pack 1 by means of the INFR circuit 18, and the signal thus received is applied to the SW circuit 25. In the process, one of the DS3MAP circuits 29 of each DS3IF circuit pack 7 is fixedly assigned one channel number on the internal path 200 input to the DS3IF circuit parc and on the internal path 400 output from the DS3IF circuit pack. Each DS3MAP circuit 29, however, is supplied with one of the four 150-Hz signals making up the internal path 200, and the channel number assigned to a given DS3MAP circuit 29 is that of the STS-1 channel on the 150-MHz signal input to the DS3IF circuit pack 7 including the particular DS3MAP circuit 29. Also, one of the four 150-Hz signals constituting the internal path 400 is input from each DS3MAP circuit 29, and the channel number assigned to a given DS3MAP circuit 29 is that of the STS-1 channel on the 150-MHz signal output from the DS3IF circuit pack 7 including the particular DS3MAP circuit 29. Further, the channel number of the STS-1 channel on the internal path 200 assigned to a DS3MAP circuit 29 is identical to the channel number of the STS-1 channel on the internal path 400 assigned to the same DS3MAP circuit 29.

The channel number of the STS-1 channel on the internal path 200 can be arbitrarily assigned to the STS-1 channel on the internal path 100 directed to the ADM circuit pack through the INFS 15 from the OC-12IF circuit pack 1. Also, the channel number of the STS-1 channel on the internal path 200 can be arbitrarily assigned to the STS-1 channel on the internal path 300 directed from the ADM circuit pack to the OC-12IF circuit pack 2. The same channel number on the internal path 200 and the internal path 400, however, is assigned to the corresponding channels on the internal path 100 and the internal path 300, respectively.

In the SW circuits 25, those of the STS-1 channel signals input through the internal path 100 which have the same channel numbers as the ones assigned to the STS-1 channels on the internal path 200 directed to the DS3IF circuit packs 7 are switched to the STS-1 channels on the internal path 200 according to the assignment.

Conversely, those TS-1 channel signals input through the internal path 400 which are assigned to the same channel numbers as the STS-1 channels on the, internal path 300 directed to the OC-12IF circuit packs 2 are switched to the STS-1 channels on the internal path 300 according to the assignment.

Further, in the SW circuits 25, those STS-1 channel signals input through the internal path 100 which are not assigned to the STS-1 channels on the internal path 200 directed to the DS3IF circuit packs 7 are switched to the STS-1 channels of the same channel numbers on the internal path 300 directed to the OC-12IF circuit pack 2 through the INES 21. These signals, however, may alternatively be switched to the channels of different channel numbers according to a predetermined assignment to the extent that the channel numbers are not duplicated.

The STS-1 channel signal sent from the ADM circuit pack 5 to the DS3IF circuit packs 7 through the internal path 200 is input to the DS3IF circuit pack 7 including the DS3MAP circuit 29 assigned the channel number of the particular STS-1 channel, converted into a 50-MHz signal by the 1/3 circuit 28 for each STS-1 channel, and sent out to the low-speed transmission path through the DS3MAP circuit 29 assigned the channel number of the particular STS-1 channel.

In each DS3IF circuit pack 7, the signal input to a DS3MAP circuit 29 from the low-speed transmission path, on the other hand, is sent to the ADM circuit pack 5 as a STS-I channel signal on the internal path 400 of the channel number assigned to the particlar DS3MAP circuit 29 through the 1/3 circuit 28 and the INFSR 26.

The STS-1 channel signal sent to the OC-12IF circuit pack 2 from the AMD Circuit pack 5 through the internal path 300 is applied to the SW 12 through the INFR 14 and the BUF 13. The SW circuit 12 switches the received 12 STS-1 channel signals directly to the STS-1 channels of the same channel numbers on the internal path directed to the POH 11. The overhead of these signals is processed according to the SONET by means of the POH circuit 11 and the SOH circuit 10, converted into an electrical signal by the opto-electric conversion module 9, and output to the high-speed transmission path as an OC-12 signal.

Figure 3:
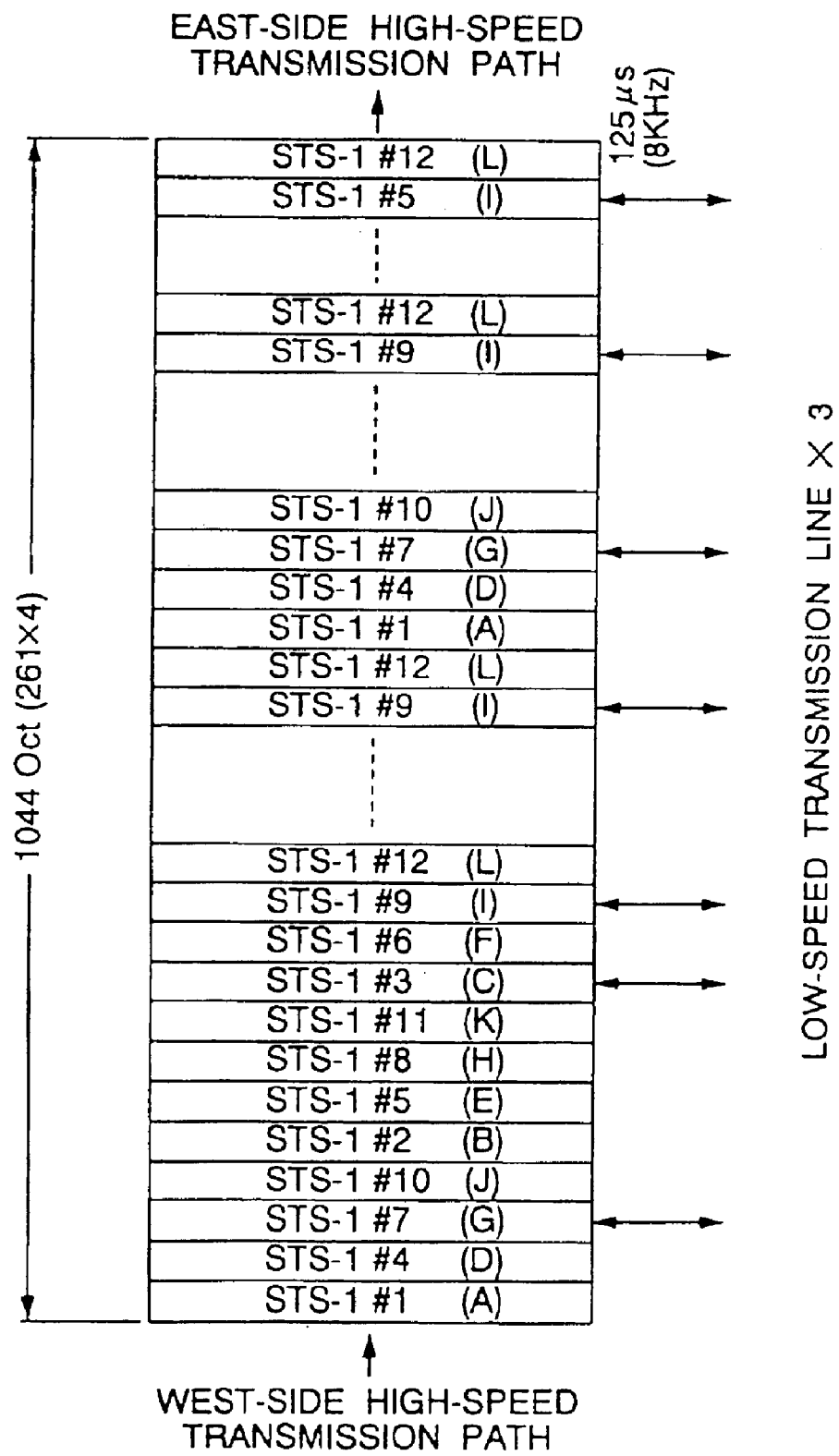
FIG. 3 is a diagram showing the manner in which STS-1 channel signals are exchanged between high-speed and low-speed transmission paths.

This operation makes it possible for the multiplex conversion unit to realize the switching of the STS-1 channels in the BLSR network as shown in FIG. 3.

FIG. 3 shows that the signals of the STS-1 channels A, B, D, E, F, H, J, K and L input from the high-speed transmission paths on the west or east side are relayed to the STS-1 channels of the same channel numbers on the east or west side, respectively, while the signals input from the high-speed transmission path on the west or east side of the three STS-1 channels C, G and I are sent to the three low-speed transmission paths, from which the input signals are sent to the high-speed transmission paths on the east or west side, respectively.

Explanation was made above about the delivery of signals from west to east side. Signals are delivered in similar fashion also from east to west side.

Now, explanation will be made about the self-healing operation of the multiplex conversion unit in the 4-fiber BLSR network.

Figure 4:
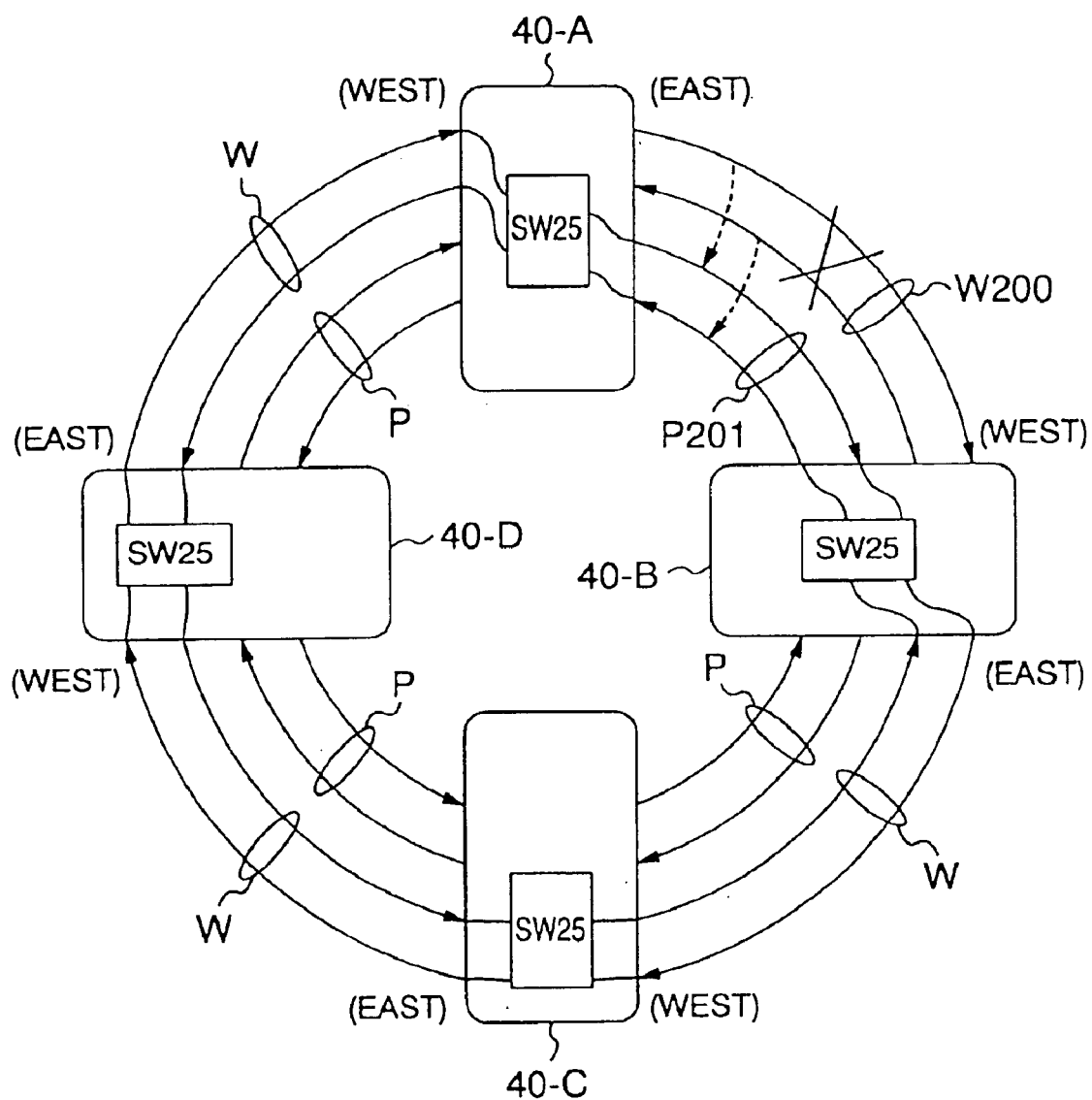
FIG. 4 is a diagram showing the self-healing process in a 4-fiber BLSR network.
Figure 5:
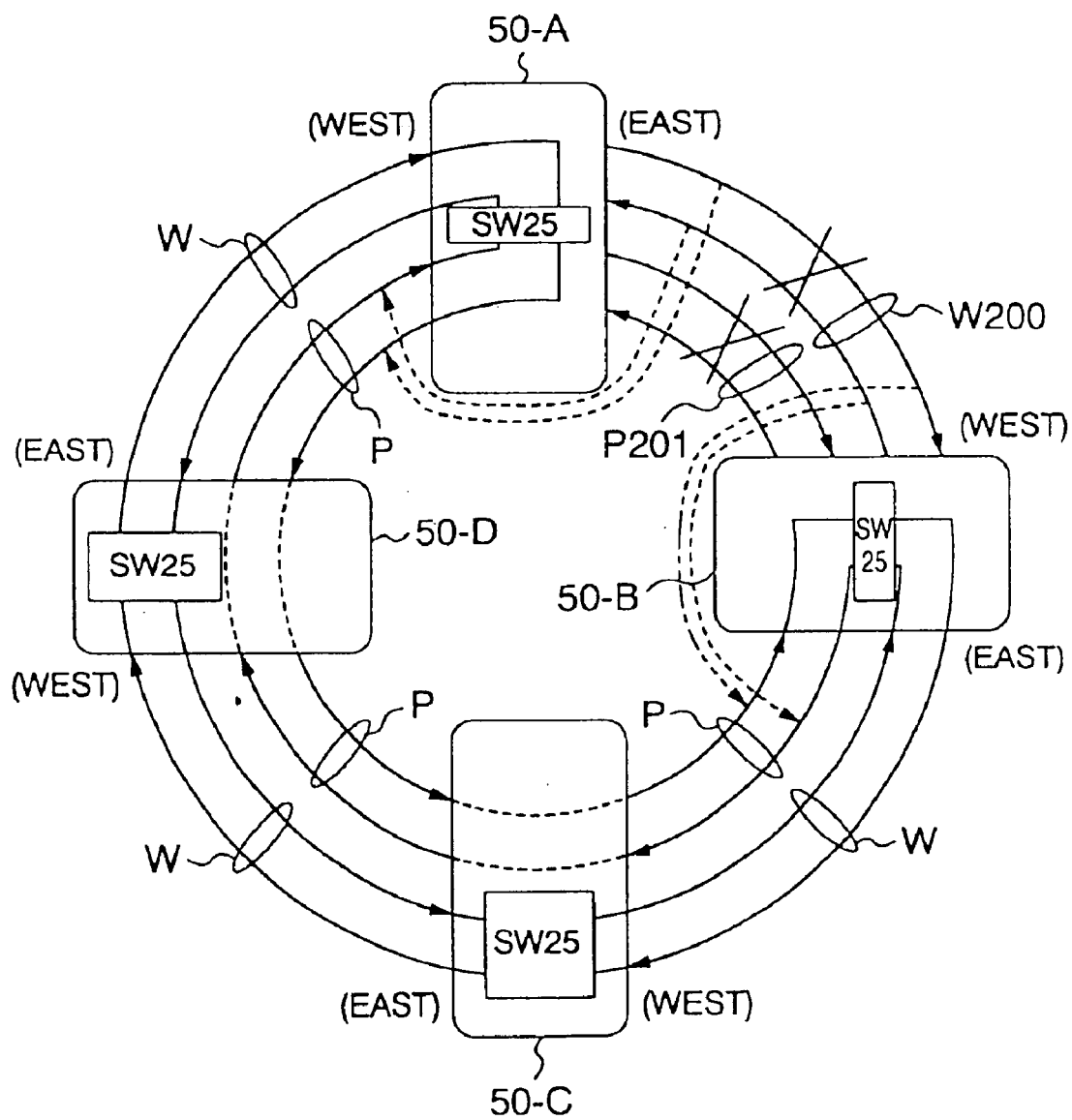
FIG. 5 is a diagram showing the self-healing process in a 4-fiber BLSR network.

FIGS. 4 and 5 are model diagrams showing the self-healing process performed in the BLSR network.

FIG. 4 represents the case in which a fault has occurred on the high-speed transmission line 200 of the active system between the east side of the multiplex conversion unit 40-A and the west side of the multiplex conversion unit 40-B. In this case, the self-healing operation enables the high-speed transmission line 201 of the stand-by system to be used for OC-12 transmission in place of the high-speed transmission line 200 of the active system between the multiplex conversion unit 40-A and the multiplex conversion unit 40-B.

This self-healing operation is realized by the span switching operation, for example, of the multiplex conversion units as described below.

Specifically, the multiplex conversion units 40-C and 40-D operate in the same manner as under the normal conditions.

The SW 25 of the ADM circuit pack 5 of the multiplex conversion unit 40-A, on the other hand, switches the STS-1 channels in such a manner that the signal thus far output to the internal path 300 directed to the OC-12IF circuit pack 2 connected to the high-speed transmission line of the active system on the east side under normal conditions is output to the internal path 500 directed to the OC-12IF circuit pack 4 connected to the high-speed transmission line of the stand-by system on the east side. Also, the STS-1 channel input by the internal path 600 from the OC-12IF circuit pack 2 connected to the high-speed transmission line of the active system on the east side that has thus far been the object of switching is replaced by the STS-1 channel input by the internal oath 700 from the OS-12IF circuit pack 4 connected to the high-speed transmission line of the stand-by system on the east side.

Further, the SW 25 of the ADM circuit pack 5 of the multiplex conversion unit 40-B switches the STS-1 channels in such a manner that the signal thus far output to the internal path 800 directed to the OC-12IF circuit pack 1 connected to the high-speed transmission line of the west-side active system under normal conditions is output-to the internal path 900 directed to the OC-12IF circuit pack 3 connected to the high-speed transmission line of the east-side stand-by system. Also, the STS-1 channel input through the internal path 100 directed from the OC-12IF circuit pack 1 connected to the high-speed transmission line of the west-side active system is switched to the STS-1 channel input through the internal path 1000 directed from the OC-12IF circuit pack 3 connected to the high-speed transmission line of the west-side stand-by system.

FIG. 5 shows the case in which a fault has occurred in both the high-speed transmission line 200 of the active system and the high-speed transmission line 201 of the stand-by system between the east side of the multiplex conversion unit 50-A and the west side of the multiplex conversion unit 50-B. FIG. 5 also shows that the self-healing operation is performed by a ring switch in which the multiplex conversion unit 50A and the multiplex conversion unit 50-B switch the signals thus far input/output by the transmission line of the faulty active system to the opposite high-speed transmission line.

In this way, the self-healing process is realized by the operation of the multiplex conversion units described below, for example.

Specifically, the multiplex conversion units 50-C and 50-D perform the operation described below in addition to the normal operation described above.

The signal sent from the OC-12IF 4 connected to the high-speed transmission line of the east-side stand-by system through the INFR 16 is switched and sent directly to the POH 11 by the SW 12 of the OC-12IF 3 connected to the high-speed transmission line of the west-side stand-by system. Also, the signal sent from the OC-12IF 3 connected to the high-speed transmission line of the west-side stand-by system through the INFR 16 is switched and sent directly to the POH 11 by the SW 12 of the OC-12IF 4 connected to the high-speed transmission line of the east-side stand-by system.

As an alternative to the above-mentioned operation, the multiplex conversion units 50-C and 50-D operate in such a manner that the signal input/output by the POH 11 of the OC-12IF 3 connected to the high-speed transmission line of the west-side stand-by system is switched directly by the SW 25 of the ADM circuit pack 5 to the signal output/input by the POH 11 of the OC-12IF 4 connected to the high-speed transmission line of the east-side stand-by system.

The SW 25 of the ADM circuit pack 5 of the multiplex conversion unit 50-A, on the other hand, switches the STS-1 channels in such a manner that the signal thus far output to the internal path 300 directed to the OC-12IF circuit pack 2 connected to the high-speed transmission line of the east-side active system under normal conditions is output to the internal path 90 directed to the OC-12IF circuit pack 3 connected to the high-speed transmission line of the west-side stand-by system. Also, the STS-1 channel input through the internal path 600 directed from the OC-12IF circuit pack 2 connected to the high-speed transmission line of the east-side active system is switched to the STS-1 channel input through the internal path 1000 directed from the OC-12IF circuit pack 3 connected to the high-speed transmission line of the west-side stand-by system.

Further, the SW 25 of the ADM circuit pack 5 of the multiplex conversion unit 50-B switches the STS-1 channels in such a manner that the signal thus far output to the internal path 800 directed to the OC-12IF circuit pack 2 connected to the high-speed transmission line of the west-side active system under normal conditions is output to the internal path 500 directed to the OC-12IF circuit pack 4 connected to the high-speed transmission line of the east-side stand-by system. Also, the STS-1 channel thus far input through the internal path 100 directed from the OC-12IF circuit pack 2 connected to the high-speed transmission line of the west-side active system is switched to the STS-1 channel input through the internal path 600 directed from the OC-12IF circuit pack 4 connected to the high-speed transmission line of the east-side stand-by system.

An application of the invention to the 4-fiber BLSR network was explained above.

Now, an application of the invention to the 2-fiber BLSR network will be explained.

In this case, the configuration of the multiplex conversion unit lacks the OC-12IF circuit packs 3, 4 included in FIG. 1.

The operation of the 2-fiber BLSR network under normal conditions is exactly the same as that of the 4-fiber BLSR network under normal conditions. In the 2-fiber BLSR network, however, one half of the 12 STS-1 channels, for example, channels G to L, are included in the stand-by system and are not used normally.

Now, explanation will be made about the operation of the multiplex conversion unit at the time of self-healing in the 2-fiber BLSR network.

Figure 6:
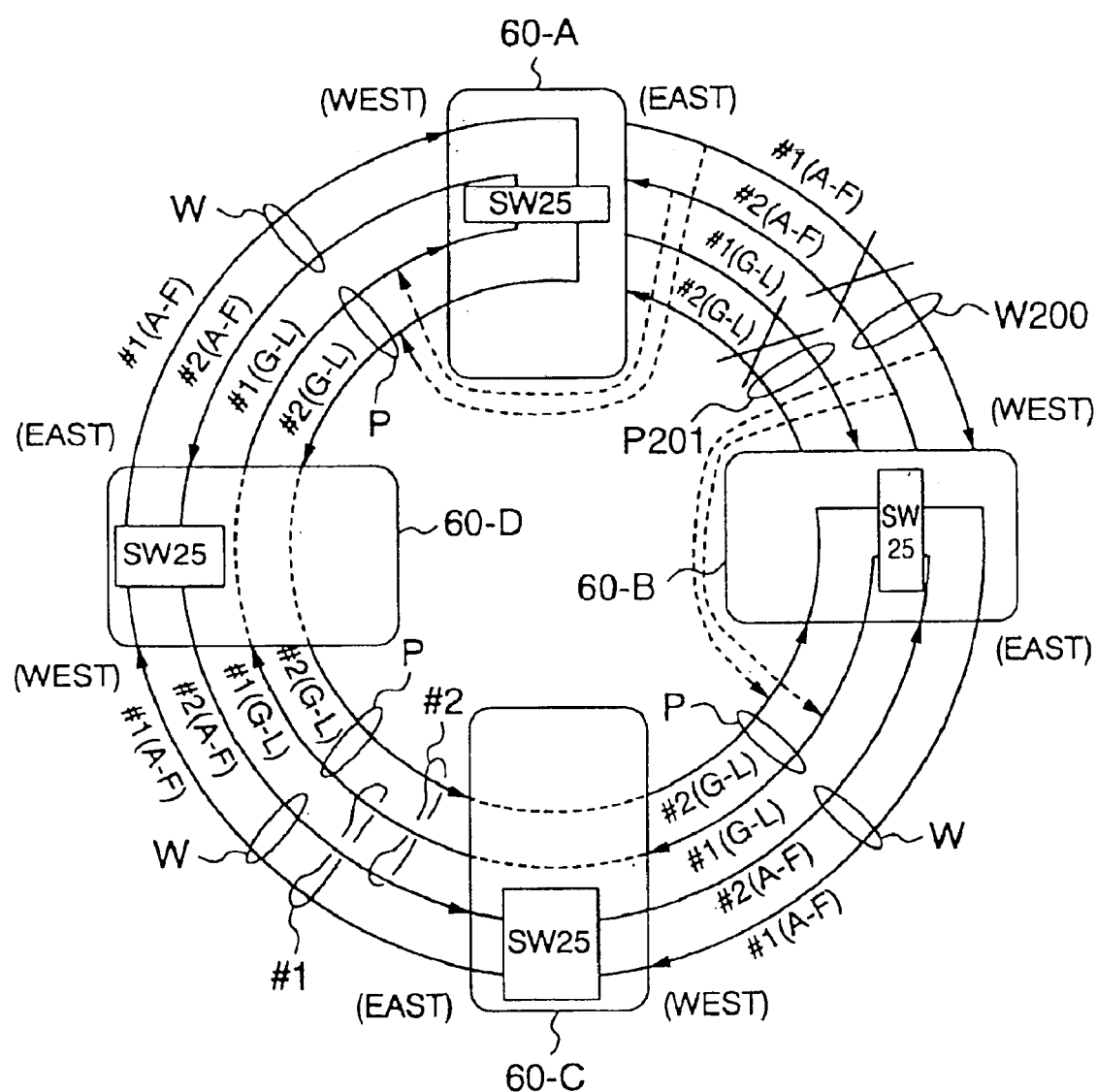
FIG. 6 is a diagram showing the self-healing process in a 2-fiber BLSR network.

FIG. 6 shows the case in which a fault has occurred on the high-speed transmission line 200 between the east side of the multiplex conversion unit 60-A and the west side of the multiplex conversion unit 60-B. Also, FIG. 6 indicates that the self-healing operation of the fault is performed by line switching of the multiplex conversion unit 60-A and the multiplex conversion unit 60-B in such a fashion that the signal thus far input/output through the transmission line of the active system associated with the fault is switched to be input/output through the STS-1 channel of the stand-by system of the opposite high-speed transmission line. In FIG. 6, however, a single high-speed transmission path is shown to include two sub-transmission paths of channels (A–F) and (G–L). The sub-transmission paths associated with each of the two high-speed transmission paths connecting the two multiplex conversion units are designated by one of the two reference numerals #1 and #2.

This self-healing process is realized, for example, by the following operation of the multiple conversion units.

Specifically, the multiplex conversion units 60-C and 60-D perform the following operation in addition to the normal operation described above.

The SW 25 of the ADM circuit pack 5 of the multiplex conversion units 60-C and 60-D performs the switching operation in such a manner that the STS-1 channel signal of the stand-by system input/output through the POH 11 of the OC-12IF 1 connected to the west-side high-speed transmission line is switched directly to the STS-1 channel signal of the stand-by system input/output through the POH 11 of the OC-12IF 2 connected to the high-speed transmission line of the east-side stand-by system.

The SW 25 of the ADM circuit pack 5 of the multiplex conversion unit 60-A, on the other hand, switches the STSI-1 channels by TSI in such a manner that the signal thus far output to the active STS-1 channels A to F of the internal path 300 directed to the OC-12IF circuit pack 2 connected to the east-side high-speed transmission line under normal conditions is output to the stand-by STS-1 channels G to L of the internal path 800 directed to the OC-12IF circuit pack 1 connected to the west-side high-speed transmission line. Also, the active input STS-1 channels A to F of the internal path 600 directed from the OC-12IF circuit pack 2 connected to the east-side high-speed transmission line are switched by TSI to the stand-by input STS-1 channels G to L of the internal path 100 directed from the OC-12IF circuit pack 1 connected to the west-side high-speed transmission line.

The SW 25 of the ADM circuit pack 5 of the multiplex conversion unit 60-B, on the other hand, switches the STS-1 channels in such a manner that the signal thus far output to the active STS-1 channels A to F of the internal path 800 directed to the OC-12IF circuit pack 1 connected to the west-side high-speed transmission line under normal conditions is switched to the stand-by STS-1 channels G to L of the internal path 300 directed to the OC-12IF circuit pack 2 connected to the east-side high-speed transmission line. Also, the active input STS-1 channels A to F of the internal path 100 directed from the OC-12IF circuit pack 1 connected to the west-side high-speed transmission line are switched to the stand-by input STS-1 channels G to L of the internal path 600 directed from the OC-12IF circuit pack 2 connected to the east-side high-speed transmission line.

An application of the invention to the 2-fiber BLSR network was described above.

Now, an application of the invention to the LADM network will be explained.

In this case, the multiplex conversion unit has a configuration exactly identical to that shown in FIG. 1, and operates exactly the same way as the multiplex conversion unit of FIG. 1 under normal conditions. Also, the self-healing operation is performed in the same way as for the multiplex conversion units 50-A and 50-B shown in FIG. 4.

Now, an application of the invention to the UPSR network will be explained.

Figure 7:
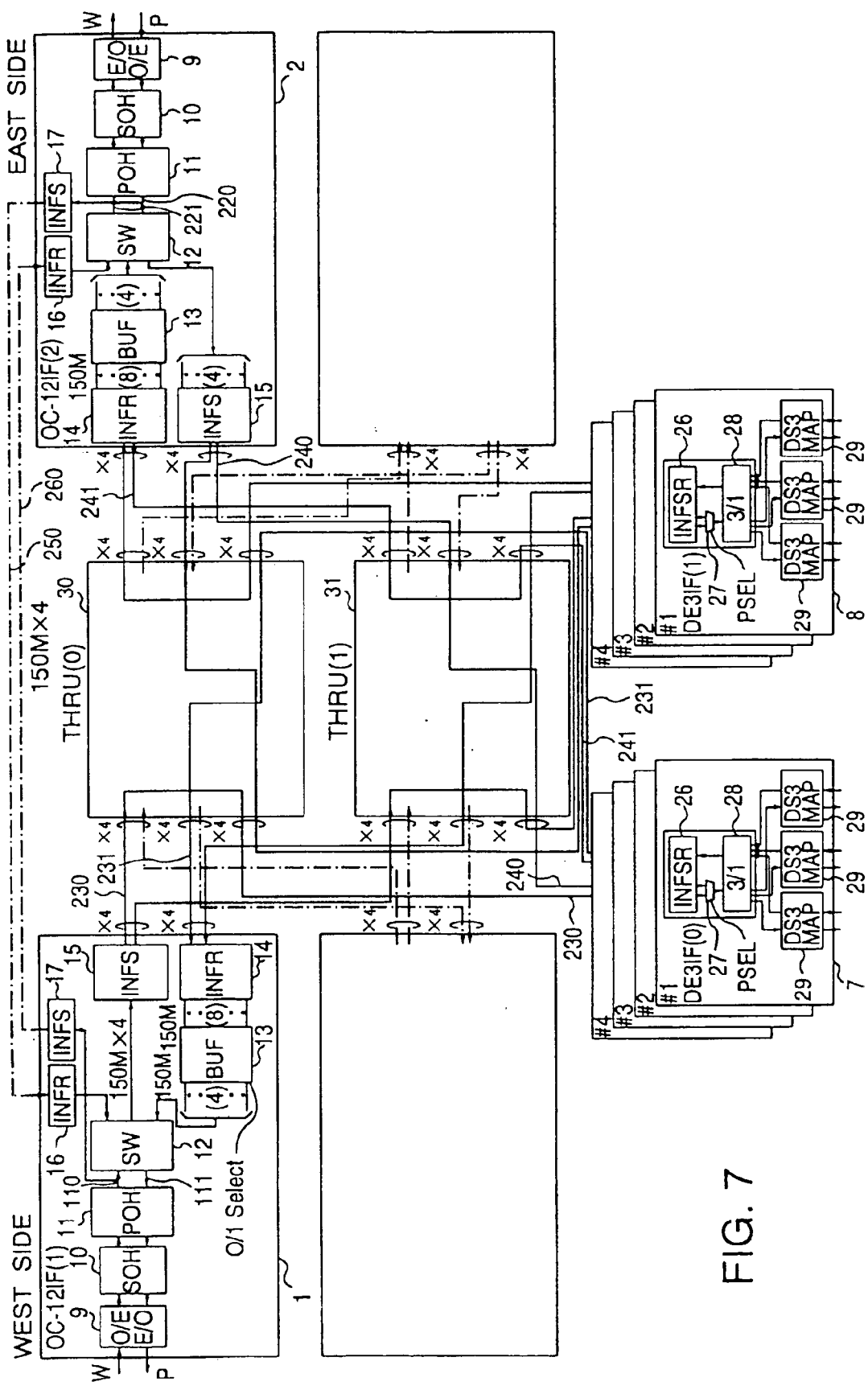
FIG. 7 is a diagram showing a configuration of multiplex conversion units applicable to a UPSR network according to the present invention.

A configuration of the multiplex conversion unit in this application is shown in FIG. 7.

As shown in FIG. 7, this configuration lacks the OC-12IF circuit packs 3, 4 connected to the high-speed transmission line of the stand-by system as compared with the configuration of FIG. 1, and includes two THRU circuit packs 30, 31 in place of the two ADM circuit packs 5, 6, respectively.

With this configuration, assume that the high-speed transmission path for transmitting the signal from west to east side is an active system, and the high-speed transmission path for transmitting the signal from east to west side, constitutes a stand-by system.

Each DS3MAP circuit 29 in each DS3IF circuit pack 7 is assigned the same channel number as in the internal paths 230, 240. Also, the channels of the internal paths 230, 240 are assigned arbitrary channel numbers of the internal paths 210, 211, 220, 221. The channel numbers of the internal paths 230, 240, however, correspond to the same channel numbers of the internal paths 210, 211, 220, 221.

The SW 12 of the OC12-IF circuit pack 1 on the west side operates in such a manner that the signals of the STS-1 channels of the internal path 211 directed from the POH 11 and having the channel numbers assigned to the internal path 230 directed to the DS3IF circuit packs 7 are output to the internal-path 230 in accordance with the assignment. In similar fashion, the SW 12 of the OC12-IF circuit pack 2 on the east side operates in such a way that the signals of the STS-1 channels of the internal path 221 directed from the POH 11 and having the channel numbers assigned to the internal path 240 directed to the DS3IF circuit packs 7 are output to the internal path 240 in accordance with the particular assignment.

The DS3IF circuit packs 7 normally select the signal from the internal path 230 by means of the PSEL 27. Also, the DS3IF circuit packs 7 output the signal from a DS3MAP circuit 29 associated with the internal paths 231, 241 to the STS-1 channel having the channel number assigned to the particular DS3MAP circuit 29.

The SW 12 of the OC12-IF circuit pack 1 on the west side operates in such a manner that the signals of the STS-1 channels of the internal path 231 having the channel numbers assigned to the internal path 211 directed to the POH 11 are output to the internal path 211 in accordance with the particular assignment. Also, the STS-1 channels of the internal path 250 obtained from the POH 11 of the OC-12IF circuit pack 2 on the east side through the INFR 16 and having the channel numbers of the internal path 211 not assigned to the internal path 231 directed from the DS3IF circuit packs 7 are output to the STS-1 channels of the same numbers of the internal path 211. In similar fashion, the SW 12 of the east-side OC12-IF circuit pack 2 operates in such a manner that the signals of the STS-1 channels of the internal path 241 having the channel numbers assigned to the internal path 221 directed to the POH 11 are output to the internal path 221 in accordance with the particular assignment. Also, the signals of the STS-1 channels of the internal path 260 obtained from the POH 11 of the west-side OC-12IF circuit path 1 through the INFR 16 and having the channel numbers of the internal path 211 not assigned to the internal path 241 directed from the DS3IF circuit packs 7 are output to the STS-1 channels of the internal path 221 having the same channel numbers.

Now, explanation will be made about the path switching operation for the self-healing process.

The PSEL of each DS3IF circuit pack 7 selects a faulty STS-1 channel from the internal path 240 directed from the east-side OC-12IF circuit pack 2 instead of from the internal path 230 directed from the west-side OC-12IF circuit pack 1. This selection is performed for each STS-1 channel thereby to realize a path switch.

An application to the UPSR network was explained above.

Now, an application of the invention to the TM network will be explained.

In this case, the configuration of the multiplex conversion unit is the same as that of FIG. 7. The OC-12IF circuit packs 1, 2, however, are connected not to the west-side high-speed transmission path and the east-side high-speed transmission path but to the high-speed transmission line of the active system and the high-speed transmission line of the stand-by system.

The operation of the multiplex conversion unit for the TM network is performed in the manner described below.

Each DS3MAP circuit 29 of each DS3IF circuit pack 7 is assigned the same channel number as the corresponding channel number in the internal paths 230, 240. The internal paths 230, 240, on the other hand, are assigned arbitrary channel numbers selected from the channel numbers of the internal paths 210, 211, 220, 221. The channels of the internal paths 230, 240, however, are assigned the same channel numbers as the corresponding channels of the internal paths 210, 211, 220, 221, respectively.

The SW 12 of the OC2-IF circuit pack 1 accommodating the high-speed transmission line of the active system operates in such a manner that the signals of the STS-1 channels of the internal path 211 directed from the POH 11 and having the channel numbers assigned to the internal path 230 directed to the DS3IF circuit pack 7 are output to the internal path-230 according to the particular assignment. In similar fashion, the SW 12 of the OC12-IF circuit pack 2 of the stand-by system operates in such a way that the signals of the STS-1 channels of the internal path 221 directed from the POH 11 and having the channel numbers assigned to the internal path 240 directed to the DS3IF circuit packs 7 are output to the internal path 240 according to the particular assignment.

The DS3IF circuit packs 7 normally select the signal from the internal path 230 by means of the PSEL 27. Also, the DS3IF circuit packs 7 output the signal from a given DS3MAP circuit 29 associated with the internal paths 231, 241 to the STS-1 channels having the channel numbers assigned to the particular DS3MAP circuit 29.

The SW 12 of the OC12-IF circuit pack accommodating the high-speed transmission line of the active system operates in such a manner that the signals of the STS-1 channels of the internal path 231 having the channel numbers assigned to the internal path 211 directed to the POH 11 are output to the internal path 211 according to the particular assignment. In similar fashion, the SW 12 of the OC12IF circuit pack 2 accommodating the high-speed transmission line of the stand-by system operates in such a way that the signals of the STS-1 channels of the internal path 241 having the channel numbers assigned to the internal path 221 directed to the POH 11 are output to the internal path 221 according to the particular assignment.

The line switch for self-healing a fault that has occurred in the high-speed transmission line of the active system is realized by the PSEL 27 of each DS3IF circuit pack 7 selecting the internal path 240 directed from the OC-12IF circuit pack 2 but not the internal path 230 directed from the OC-12IF circuit pack 1 accommodating the high-speed transmission line of the active system.

The configuration of the multiplex conversion unit and the method of configuration thereof were described above for applications to the 4-fiber BLSR, 2-fiber BLSR, LADM, UPSR and TM networks. As understood from the foregoing description, according to this embodiment, the ADM circuit pack is used in applications of the invention to the 4-fiber BLSR, 2-fiber BLSR and LADM networks. In applications to the UPSR and TM networks, on the other hand, a multiplex conversion unit can be configured using the inexpensive THRU circuit pack having only a wiring in place of the expensive ADM circuit pack including a large scale SW. The multiplex conversion unit applied to the UPSR and TM networks can thus be realized at low cost. Also, the multiplex conversion unit for the 4-fiber BLSR, 2-fiber BLSR and LADM networks can be readily configured simply by acquiring an ADM circuit pack and replacing the THRU circuit pack with the ADM circuit pack.

Now, a second embodiment will be explained below.

According to the second embodiment, the multiplex conversion unit is configured by preparing another type of OC-12IF circuit pack in addition to the OC-12IF circuit packs used in the first embodiment and combining the circuit packs.

First, an application of the invention to the 4-fiber BLSR, 2-fiber BLSR and LADM networks will be explained.

Figure 8:
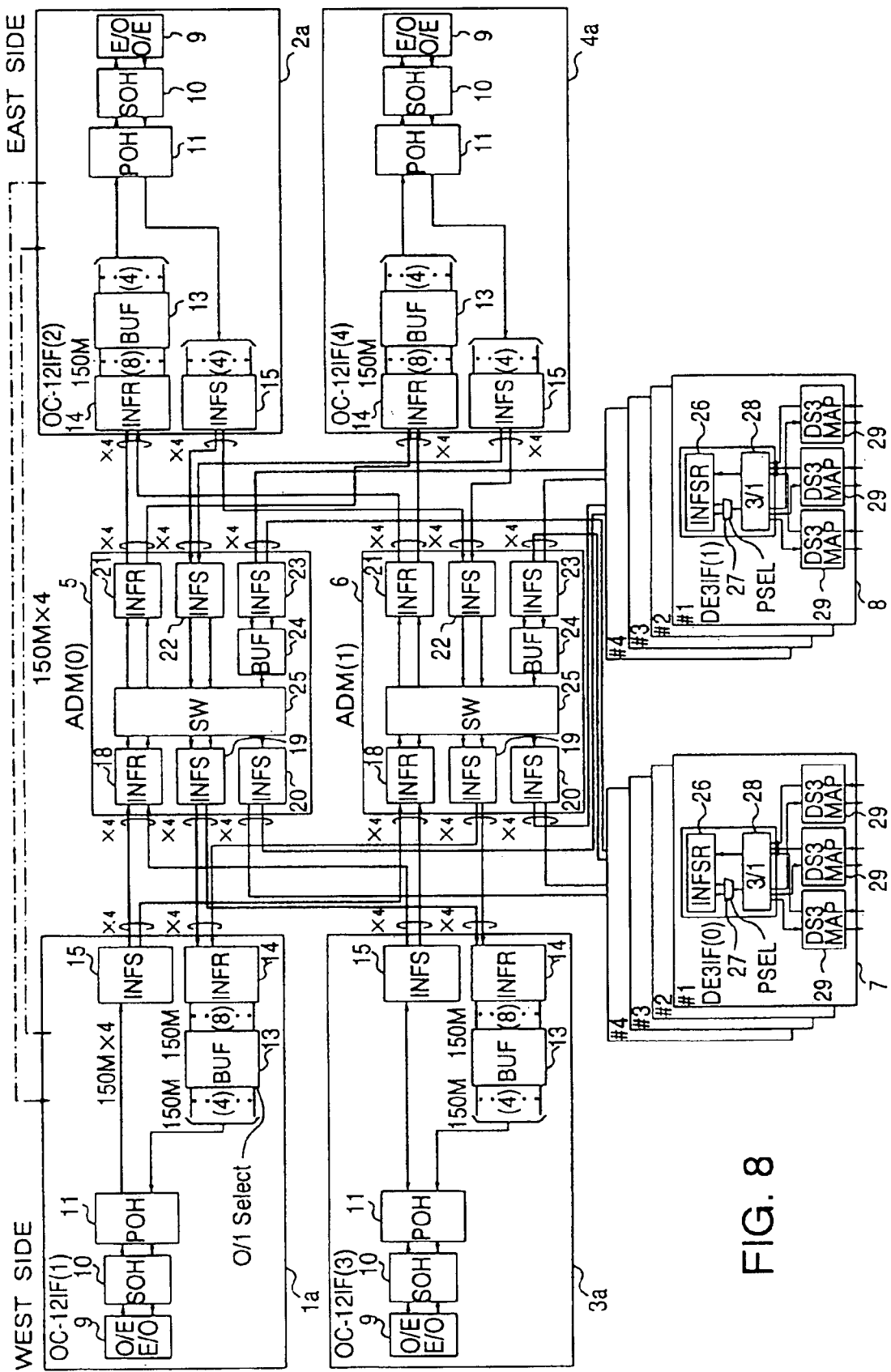
FIG. 8 is a diagram showing a configuration of multiplex conversion units applicable to a 4-fiber BLSR network according to another embodiment of the invention.

FIG. 8 shows the configuration of a multiplex conversion unit in such an application.

Characters 1a to 4a in FIG. 8 designate the OC-12IF circuit packs of the type prepared anew according to the present embodiment. In applications to the 2-fiber BLSR and the LADM networks, however, the OC-12IF circuit packs 3a, 4a may be eliminated.

As shown in FIG. 8, the OC-12IF circuit packs 1a to 4a prepared anew according to the present embodiment are configured of the OC-12IF circuit packs 1 to 4 used in the first embodiment (FIG. 1) each lacking the SW 12, INFR 16 and INFS 17. Also, the POH, 11 in this embodiment has an add/drop multiplex (ADM) function between four 150-MHz STS-1 channel signals multiplexed with the multiplexing degree of 3 and a STS-1 channel signal multiplexed with the multiplexing degree of 12.

In the case of the 4-fiber BLSR, 2-fiber BLSR and LADM networks according to the first embodiment described above, the SW 12 performs only an equivalent transmission and an equivalent switching of the signal between the POH 11, INSF 15 and BUF 13. Exactly the same operation as in the first embodiment, therefore, can be performed without the SW 12. Also, the INFR 16 and the INFS 17, which are used as the internal paths 250, 260 directly connecting the two OC-12IF circuit packs for self-healing in the case of FIG. 5, can be replaced by the signaltransmission and receipt through the SW 25 of the ADM circuit pack 5, and therefore the NFR 16 and the INFS 17 can be omitted without posing any problem.

Figure 9:
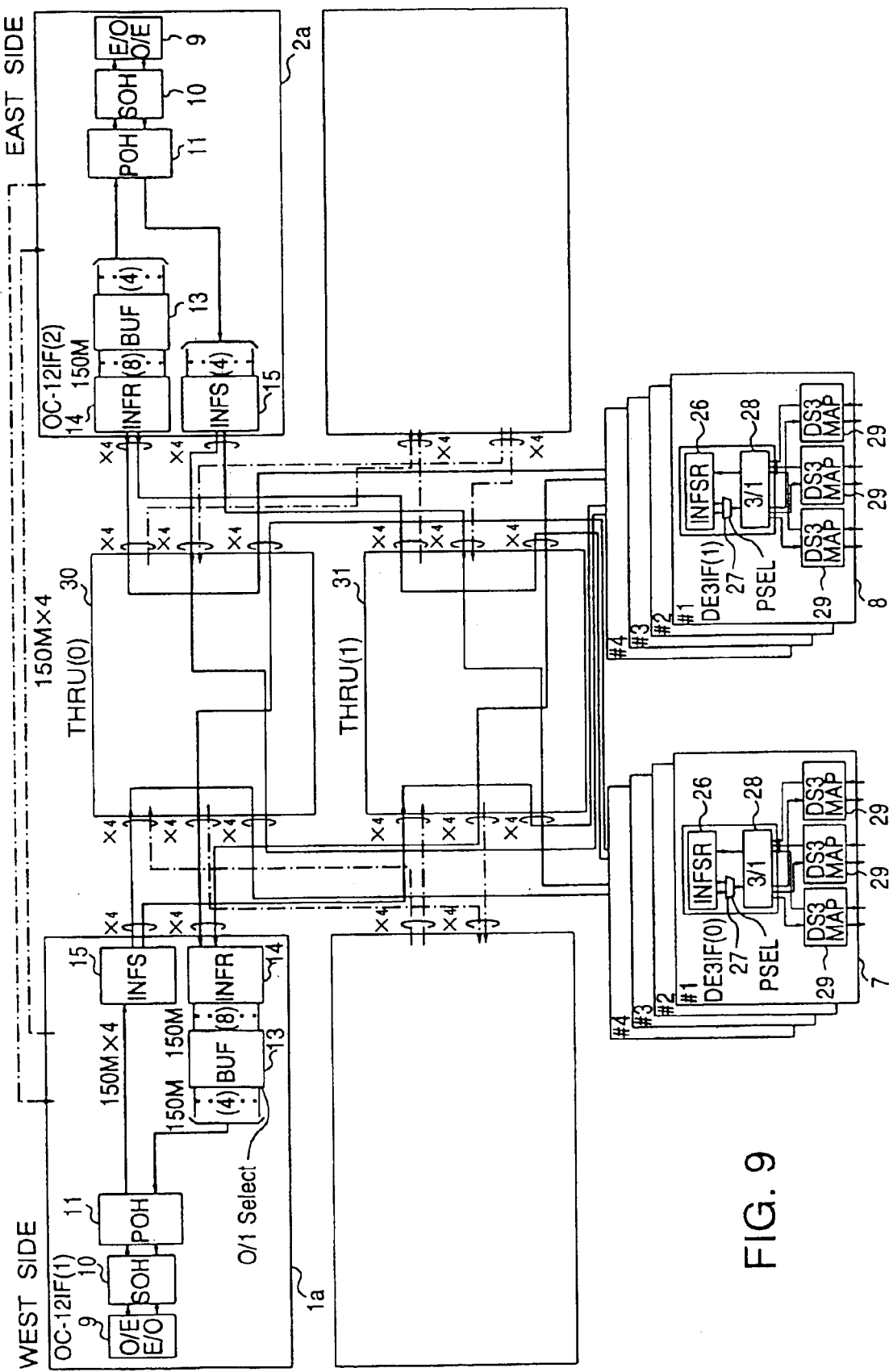
FIG. 9 is a diagram showing a configuration of multiplex conversion units applicable to a TM network according to an embodiment of the present invention.

A configuration of a multiplex conversion unit for application to the TM network is shown in FIG. 9.

Also in this application, the OC-12IF circuit packs 1a, 2a prepared anew in the second embodiment are used in place of the OC-12IF circuit packs used in the first embodiment. In this case, although the TSA function is lost for lack of the SW 12, the TM network can be realized by the ADM function alone using the 1/3 circuits 26 of the DS3IF circuit packs 7, 8 and POH 11.

Now, the UPSR network will be explained. In this case, a multiplex conversion unit is configured in a manner similar to the first embodiment by using the OC-12IF circuit packs 1, 2 as in the first embodiment without using the OC-12IF circuit packs 1a, 2a prepared in the second embodiment. According to the second embodiment described above, a multiplex conversion unit applicable to the 4-fiber BLSR, 2-fiber BLSR, LADM and TM networks can be configured at lower cost. Further, a multiplex conversion unit applicable to the UPSR network can be readily configured by changing the circuit packs.

In the multiplex conversion unit of each configuration described above, the switching operation of the SW 12 and SW 25 and the selection of the PSEL 27 are controlled by a control unit not shown in the drawings. The control unit is disposed on a circuit pack different from the circuit packs described above and is kept mounted on the multiplex conversion unit. Also, the control unit performs the control operation in accordance with an operation command transmitted by an operation unit disposed in the network to the network through the control section of one of the multiplex conversion units in the network. The operation command transmitted to the network is extracted by the POH 11, for example, and transferred to the control unit.

What is claimed is:

1. A multiplex conversion unit comprising four types of circuit packs including a high-speed interface circuit pack, a low-speed interface circuit pack, an add/drop multiplex circuit pack and a connecting circuit pack, wherein:

said low-speed interface circuit pack accommodates one or a plurality of low-speed transmission lines and includes an output section for outputting a low-speed signal containing one or a plurality of time slots received from said low-speed transmission line to a plurality of high-speed interface circuit packs, and a path switch section for selecting one of the low-speed signals input from said high-speed interface circuit packs for each time slot as a low-speed signal to be transmitted to one or a plurality of said low-speed transmission lines accommodated;

said high-speed interface circuit pack accommodates at least a high-speed transmission line and is adapted to output/input a plurality of line signals each containing a predetermined number of time slots transmitted to and received from said high-speed transmission line accommodated, a plurality of line signals input/output by other high-speed interface circuit packs, and a plurality of low-speed signals input/output by a low-speed interface circuit packs, said high-speed interface circuit pack including a time slot assignment section having a first time slot assignment function between a plurality of line signals received from the said high-speed transmission line accommodated and output to other high-speed interface circuit packs on the one hand and the output low-speed signal on the other hand, and a second time slot assignment function between a plurality of line signals input from other high-speed interface circuit packs and transmitted to the high-speed transmission line accommodated on the one hand and the input low-speed signal on the other hand;

said add/drop multiplex circuit pack is adapted to output/input a plurality of line signals input/output by each of said high-speed interface circuit packs and a low speed signal containing one or a plurality of time slots input/output by each of the low-speed interface circuit packs, said add/drop multiplex circuit pack including a time slot section having a time slot interchange function between a plurality of line signals and a plurality of low-speed signals, and a line switch section having a first line switch function for switching the line signal to be processed by said time slot section and a second line switch function for switching the time slots of the line signal to be processed by said time slot section using the time slot interchange function of said time slot section;

said connecting circuit pack is adapted to input/output the low-speed signal input/output by the high-speed interface circuit pack as a low-speed signal input/output by another high-speed interface circuit pack; and in a use mode of requiring a time slot assignment function alone, a plurality of high-speed interface circuit packs and a plurality of low-speed interface circuit packs are connected to each other through said connecting circuit pack in such a manner that the outputs of the low speed signals being output to the high speed interface circuit packs are the inputs to an another high speed interface circuit pack via said connecting circuits pack as the low signals to the low speed interface circuit packs.

2. A multiplex conversion unit comprising four types of circuit packs including a high-speed interface circuit pack, a low-speed interface circuit pack, an add/drop multiplex circuit pack and a connecting circuit pack, wherein:

said low-speed interface circuit pack accommodates one or a plurality of low-speed transmission lines and includes an output section for outputting a low-speed signal containing one or a plurality of time slots received from said low-speed transmission line to a plurality of high-speed interface circuit packs, and a path switch section for selecting one of the low-speed signals input from said high-speed interface circuit packs for each time slot as a plurality of low-speed interface circuit packs for each time slot as a low-speed signal to be transmitted to one or a plurality of said low-speed transmission lines accommodated;

said high-speed interface circuit pack accommodates at least a high-speed transmission line and is adapted to output/input a plurality of line signals each containing a predetermined number of time slots transmitted to and received from said high-speed transmission line accommodated, a plurality of line signals input/output by other high-speed interface circuit packs, and a plurality of low-speed signals input/output by said low-speed interface circuit packs, said high-speed interface circuit pack including a time slot assignment section having a first time slot assignment function between a plurality of line signals received from the said high-speed interface circuit packs on the one hand and the output low-speed signal on the other hand, and a second time slot assignment function between a plurality of line signals input from other high-speed interface circuit packs and transmitted to the high-speed transmission line accommodated on the one hand and the input low-speed signal on the other hand;

said add/drop multiplex circuit pack is adapted to output/input a plurality of line signals input/output by each of said high-speed interface circuit packs and a low-speed signal containing one or a plurality of time slots input/output by each of a low-speed interface circuit packs, said add/drop multiplex circuit pack including a time slot section having a time slot interchange function between a plurality of line signals and a plurality of low-speed signals, and a line switch section having a first line switch function for switching the line signal to be processed by said time slot section and a second line switch function for switching the time slots of the line signal to be processed by said time slot section using the time slot interchange function of said time slot section;

said connecting circuit pack is adapted to input/output the low-speed signal input/output by the high-speed interface circuit pack as a low-speed signal input/output by another high-speed interface circuit pack; and in a use mode of requiring a time slot assignment function and the time slot interchange function, the plurality of high-speed interface circuit packs and the plurality of low-speed interface circuit packs are connected to each other through said add/drop multiplex circuit pack, and the time slot assignment section of said high-speed interface circuit packs has the add/drop multiplex function of converting the line signals transmitted to and received from the high-speed transmission line into a plurality of low-speed signals directly output/input, and the high-speed interface pack and the low-speed interface circuit pack are connected to the add/drop multiplex circuit pack in such a manner that the outputs of the low speed signals being output to the high speed interface circuit packs are the inputs to an another high speed interface circuit pack via said add/drop circuit pack as the low signals to the low speed interface circuit packs.

* * * * *